(12) United States Patent
Freitag et al.

(10) Patent No.: US 9,570,100 B1
(45) Date of Patent: Feb. 14, 2017

(54) TWO-DIMENSIONAL MAGNETIC RECORDING DEVICE WITH CENTER SHIELD STABILIZED BY RECESSED AFM LAYER

(71) Applicant: HGST Netherlands B.V., Amsterdam (NL)

(72) Inventors: James Freitag, Sunnyvale, CA (US); Zheng Gao, San Jose, CA (US); Stefan Maat, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/918,829

(22) Filed: Oct. 21, 2015

(51) Int. Cl.
*G11B 5/39* (2006.01)
*G11B 5/11* (2006.01)
*G11B 5/33* (2006.01)

(52) U.S. Cl.
CPC ............. *G11B 5/3912* (2013.01); *G11B 5/112* (2013.01); *G11B 5/332* (2013.01); *G11B 5/3948* (2013.01)

(58) Field of Classification Search
None
See application file for complete search history.

(56) References Cited

U.S. PATENT DOCUMENTS

| | | | |
|---|---|---|---|
| 6,967,810 B2 | 11/2005 | Kasiraj et al. | |
| 7,365,949 B2 * | 4/2008 | Hayakawa | G11B 5/39 360/324.1 |
| 7,616,411 B2 * | 11/2009 | Gill | B82Y 25/00 360/321 |
| 7,961,440 B2 * | 6/2011 | Gill | B82Y 10/00 360/324.11 |
| 8,358,486 B2 | 1/2013 | Biskeborn et al. | |
| 8,395,867 B2 * | 3/2013 | Dimitrov | B82Y 25/00 360/319 |
| 8,582,249 B2 * | 11/2013 | Sapozhnikov | G01R 33/093 360/324.11 |
| 8,711,528 B1 | 4/2014 | Xiao et al. | |
| 8,824,106 B1 | 9/2014 | Garfunkel et al. | |

(Continued)

OTHER PUBLICATIONS

Kavcic, et al., "Channel Modeling and Capacity Bounds for Two-Dimensional Magnetic Recording," IEEE Trans. on Magnetics, vol. 46, No. 3, Mar. 2010, pp. 812-818.

(Continued)

*Primary Examiner* — Will J Klimowicz
(74) *Attorney, Agent, or Firm* — Jacobsen IP Law; Krista S. Jacobsen

(57) ABSTRACT

A two-dimensional magnetic recording (TDMR) read head with an antiferromagnetic (AFM) layer recessed behind a center shield. The TDMR read head comprises a first read sensor and a center shield over the first read sensor, wherein the center shield has a first thickness at an air-bearing surface (ABS) and a second thickness at a back surface, the first thickness being greater than the second thickness. A ferromagnetic layer is disposed over a portion of the center shield, wherein the ferromagnetic layer is recessed from the ABS. The TDMR read head also includes an antiferromagnetic layer over the ferromagnetic layer and a second read sensor over the antiferromagnetic layer. By recessing the AFM layer away from the ABS, the down-track spacing between read sensors is reduced, thereby improving TDMR read head performance.

21 Claims, 36 Drawing Sheets

(56) References Cited

U.S. PATENT DOCUMENTS

| | | |
|---|---|---|
| 8,873,204 B1 | 10/2014 | Gao et al. |
| 8,908,333 B1 | 12/2014 | Rudy et al. |
| 8,970,988 B1 | 3/2015 | Li et al. |
| 9,007,729 B1 | 4/2015 | Ho et al. |
| 9,042,059 B1 | 5/2015 | Katine et al. |
| 9,042,062 B2* | 5/2015 | Hong ............... H01L 43/02 360/319 |
| 9,190,078 B2* | 11/2015 | Sapozhnikov .......... G11B 5/115 |
| 9,269,383 B1* | 2/2016 | Hattori ................ G11B 5/3932 |
| 9,318,133 B2* | 4/2016 | Freitag ................ G11B 5/3909 |
| 2014/0377589 A1 | 12/2014 | Freitag et al. |
| 2015/0062735 A1* | 3/2015 | Sapozhnikov .......... G11B 5/115 360/46 |
| 2015/0371670 A1* | 12/2015 | Sapozhnikov .......... G11B 5/115 360/317 |
| 2016/0005424 A1* | 1/2016 | McKinlay ............... G11B 5/115 360/121 |

OTHER PUBLICATIONS

Krishnan, et al., "Two-Dimensional Magnetic Recording: Read Channel Modeling and Detection," Proc. IEEE Int'l Magnetics Conference, Sacramento, CA, May 5-9, 2009, pp. 1-7.

Wood, "The Feasibility of Magnetic Recording at 1 Terabit per Square Inch," IEEE Trans. on Magnetics, vol. 36, No. 1, Jan. 2000, pp. 36-42.

Wood, et al., "The Feasibility of Magnetic Recording at 10 Terabits Per Square Inch on Conventional Media," IEEE Trans. on Magnetics, vol. 45, No. 2, Feb. 2009, pp. 917-923.

* cited by examiner

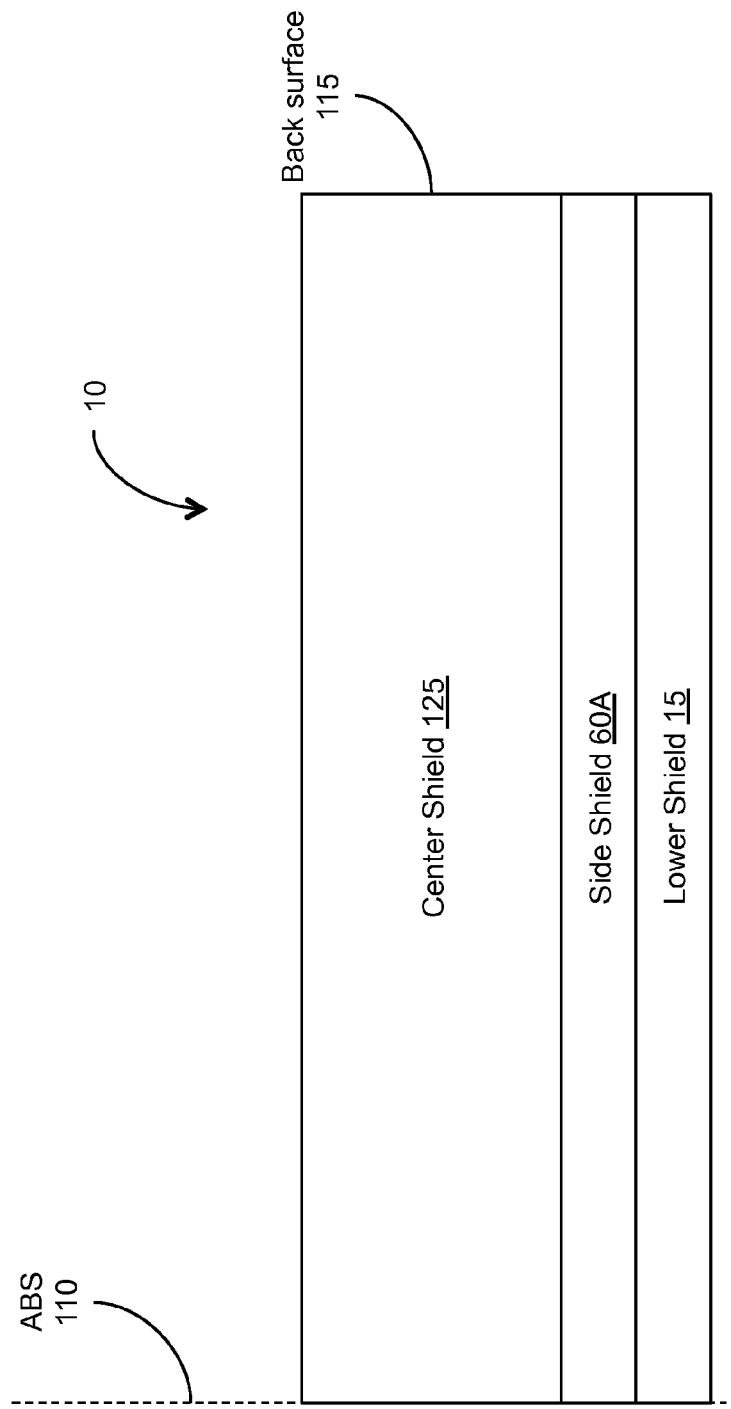

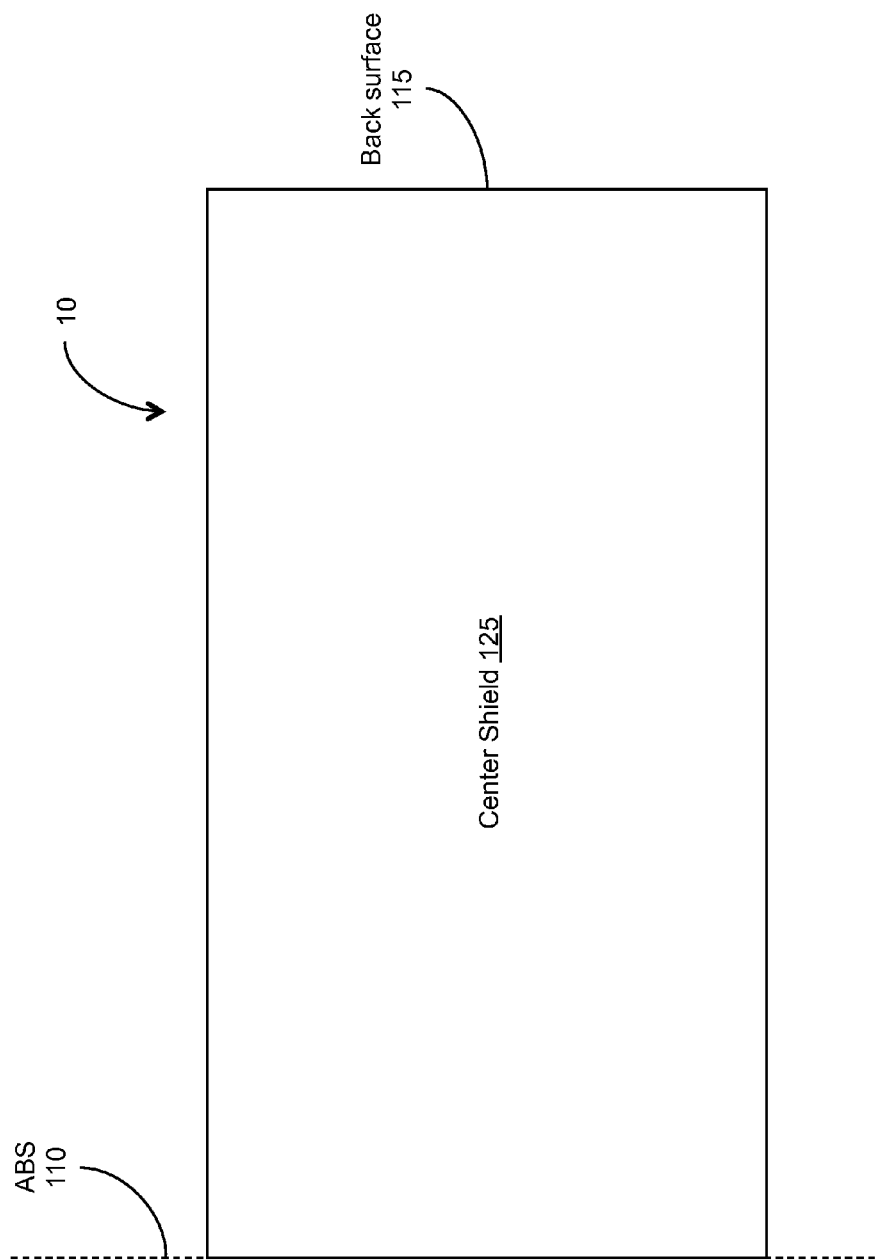

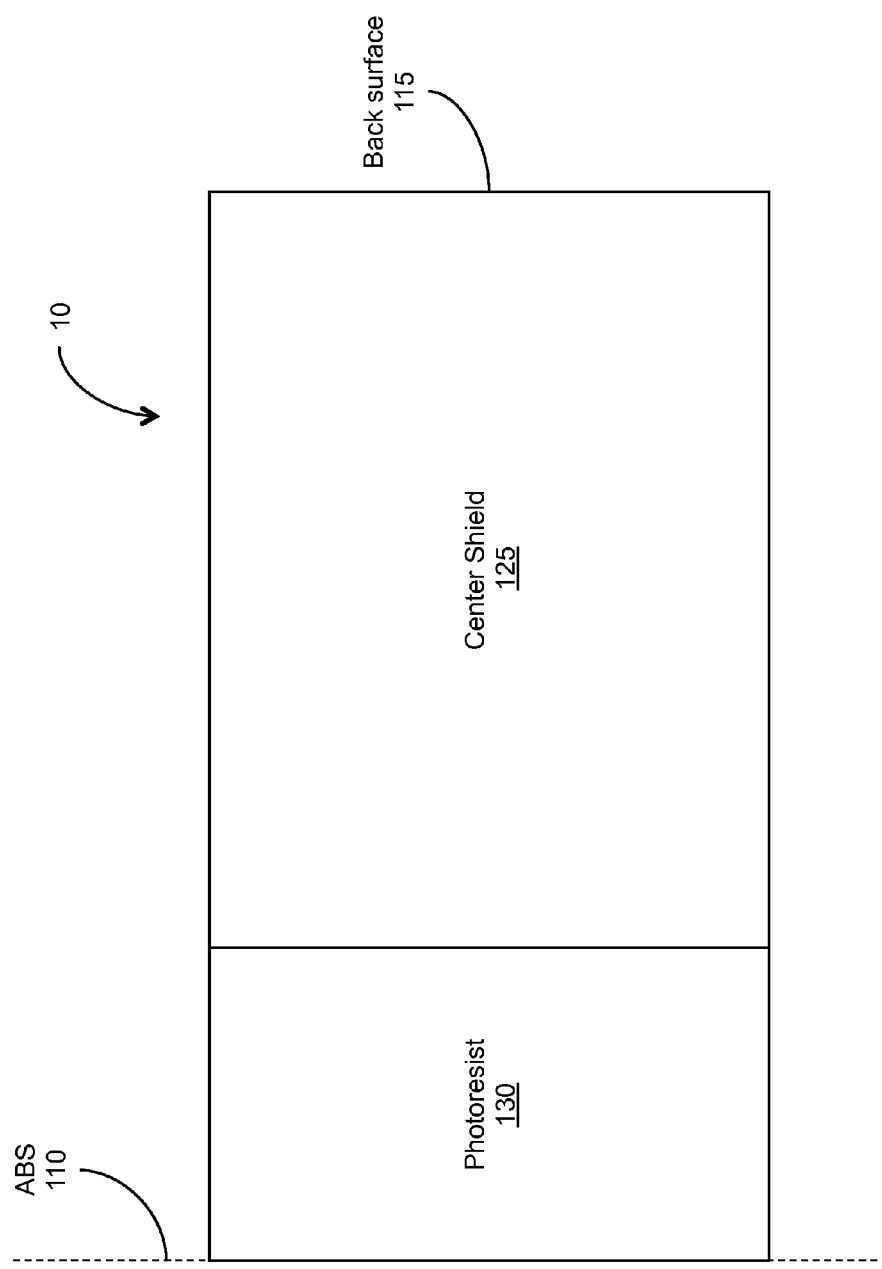

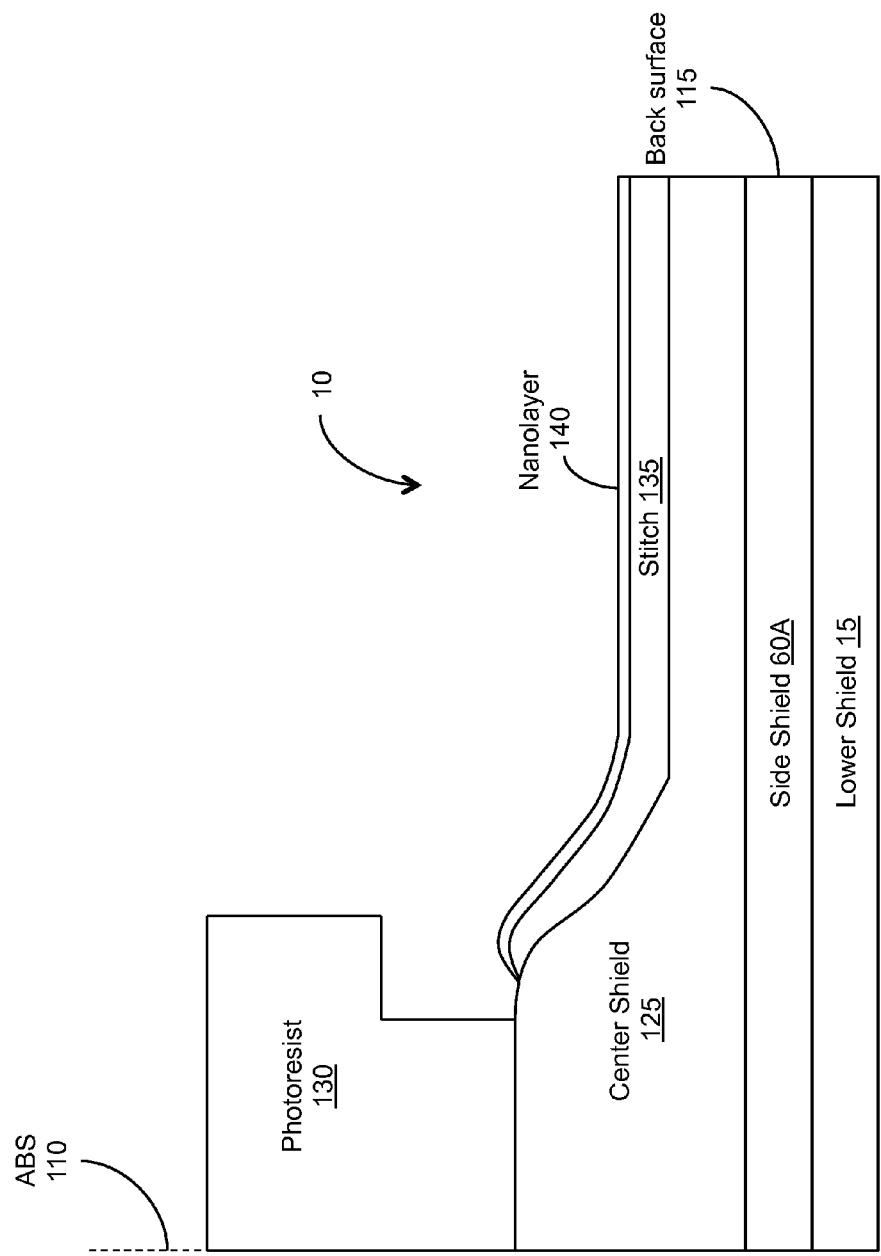

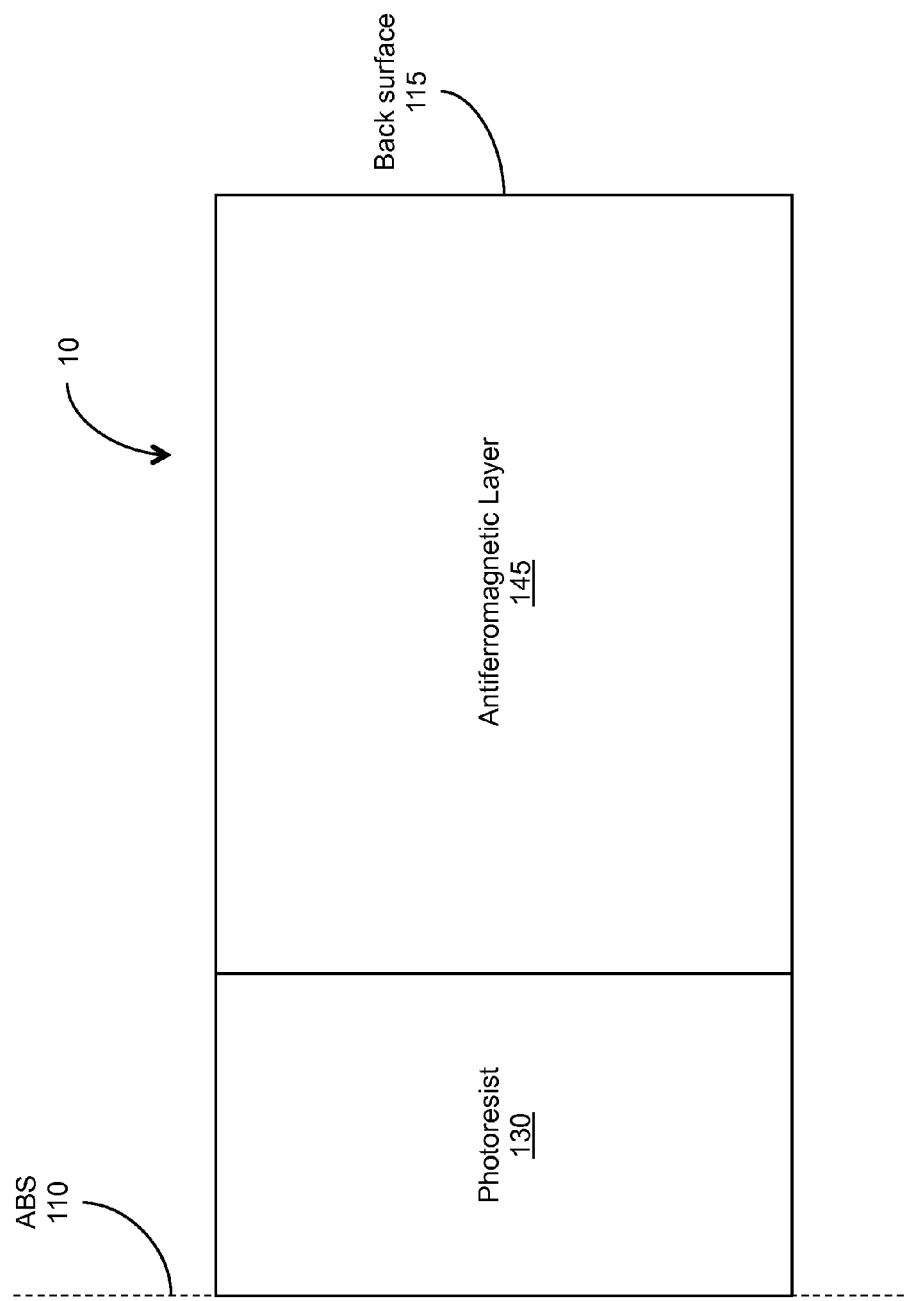

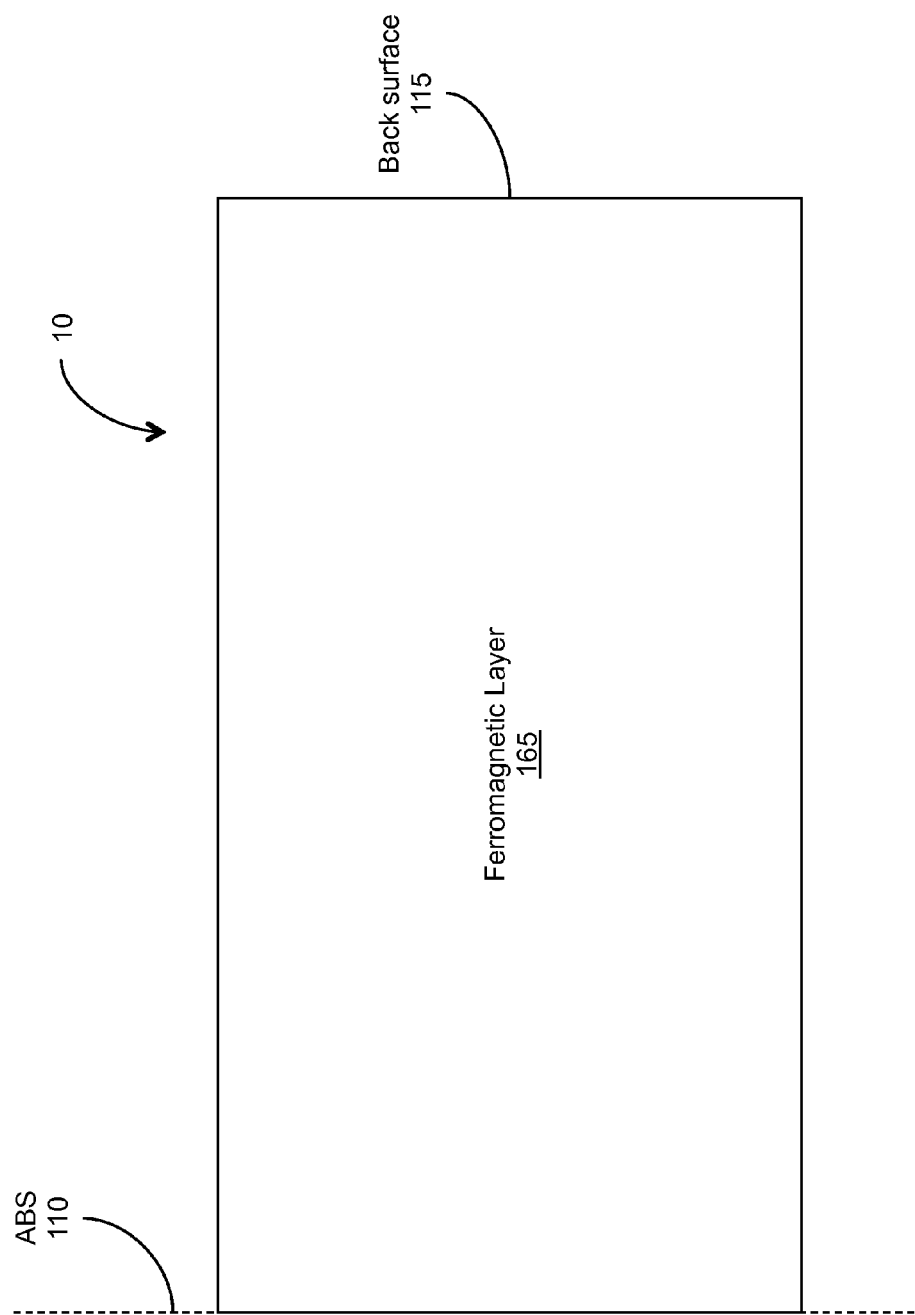

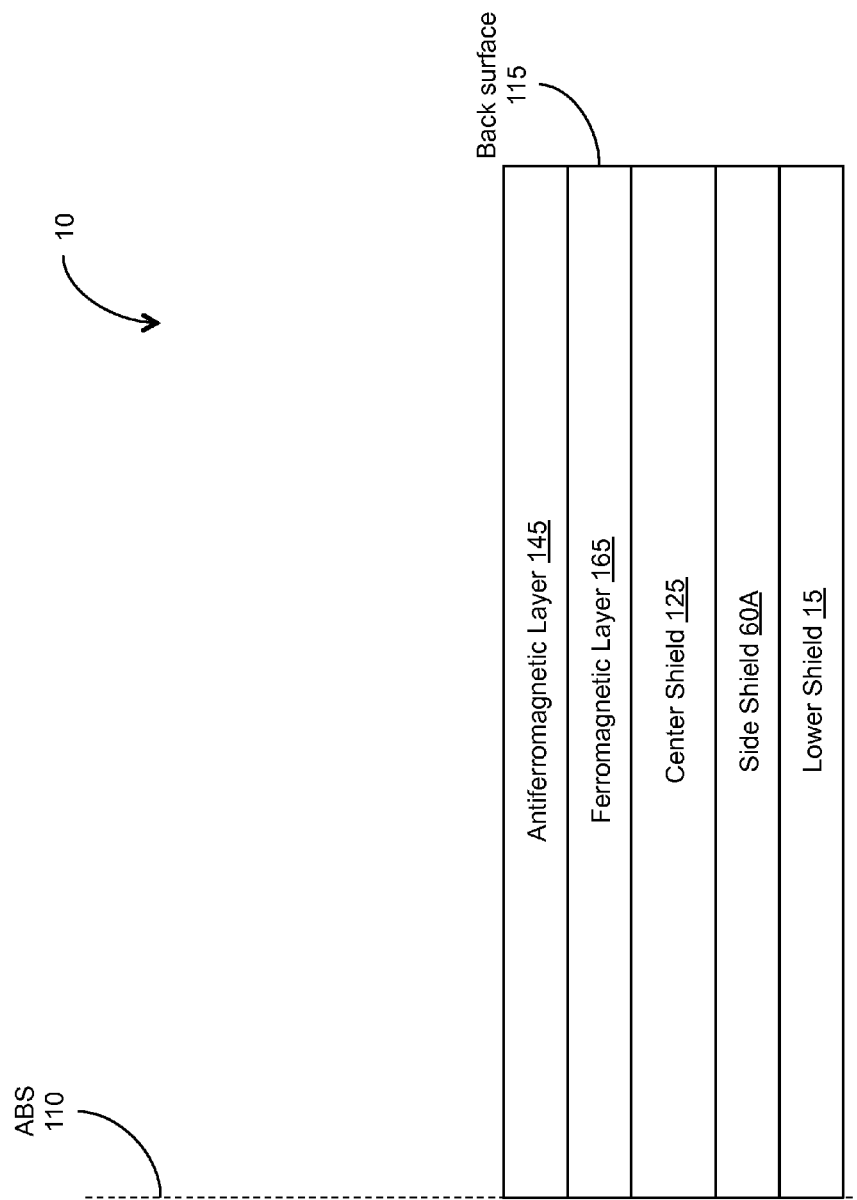

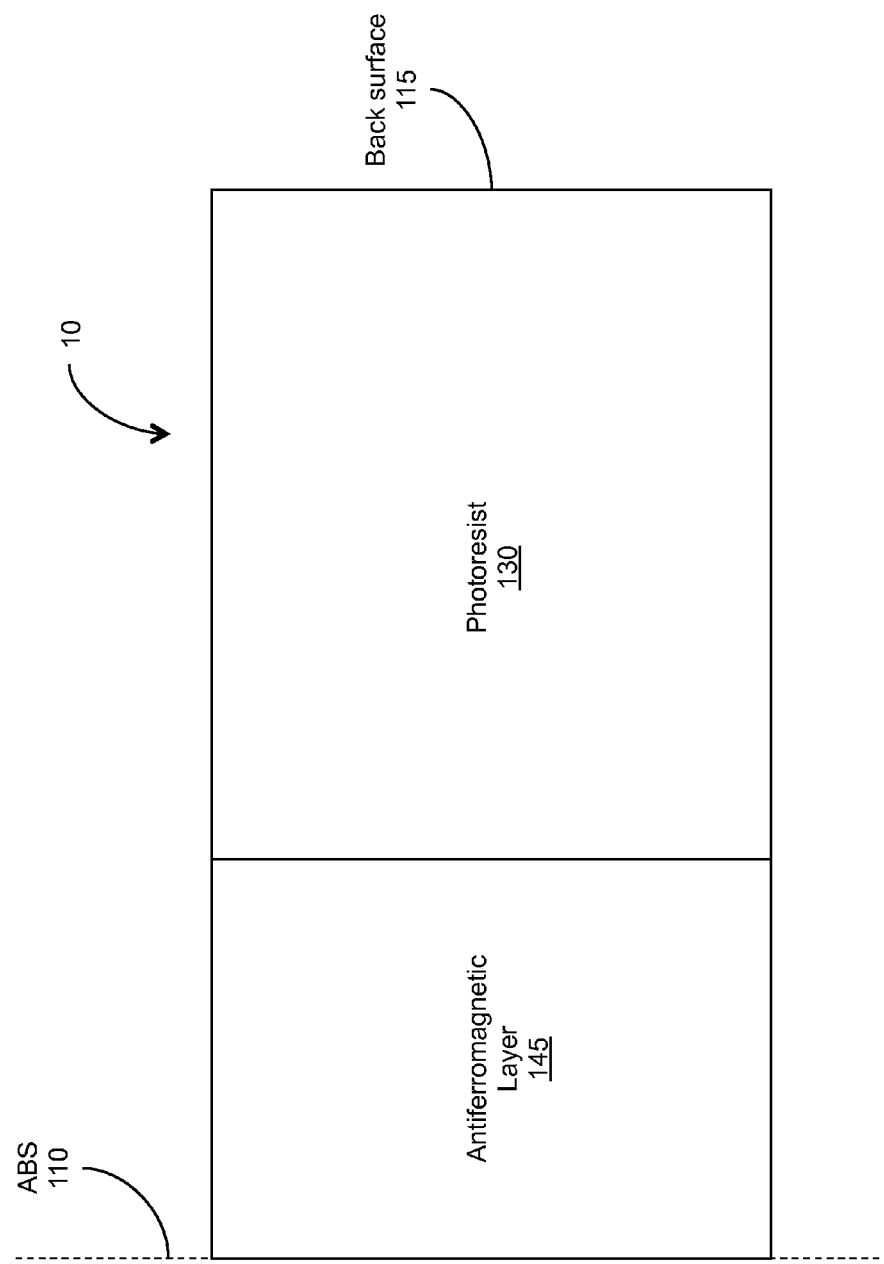

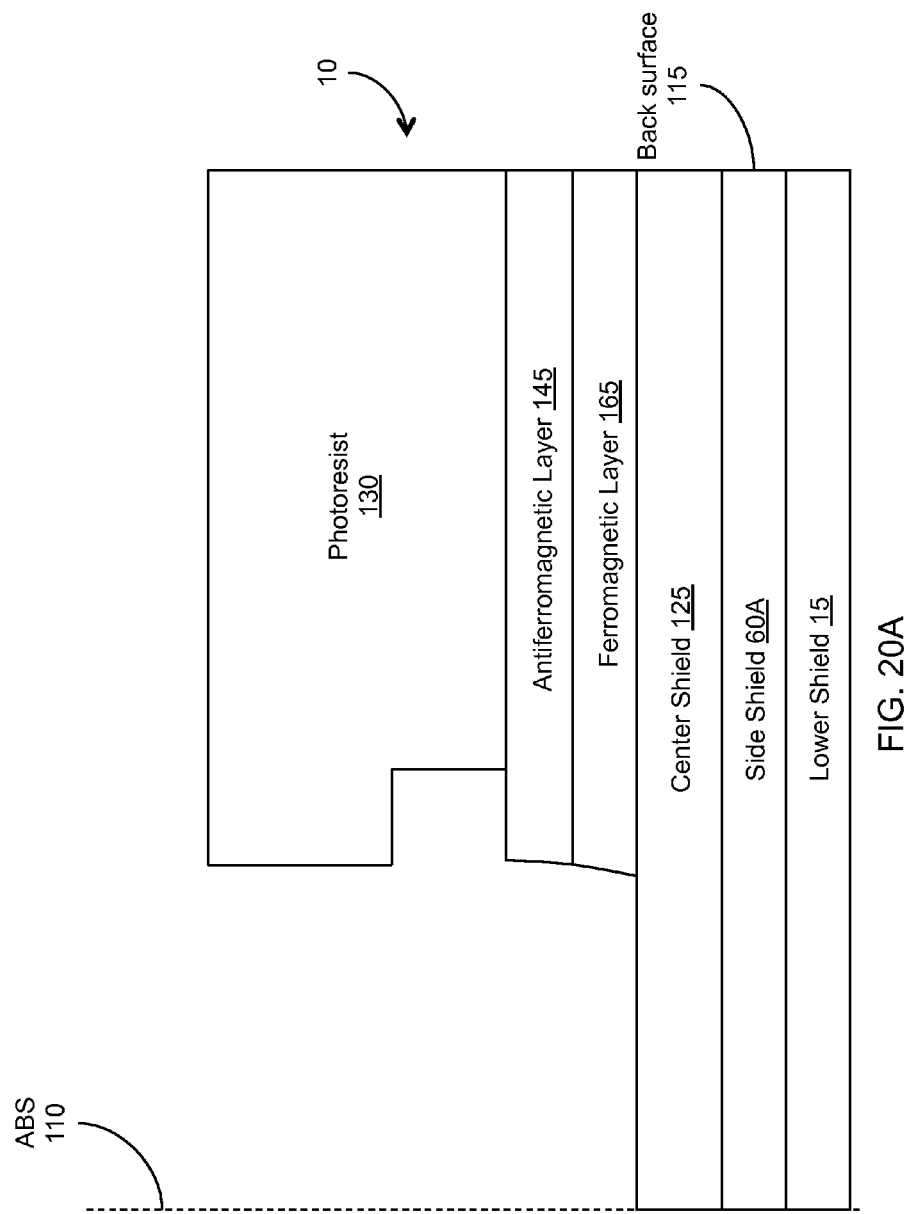

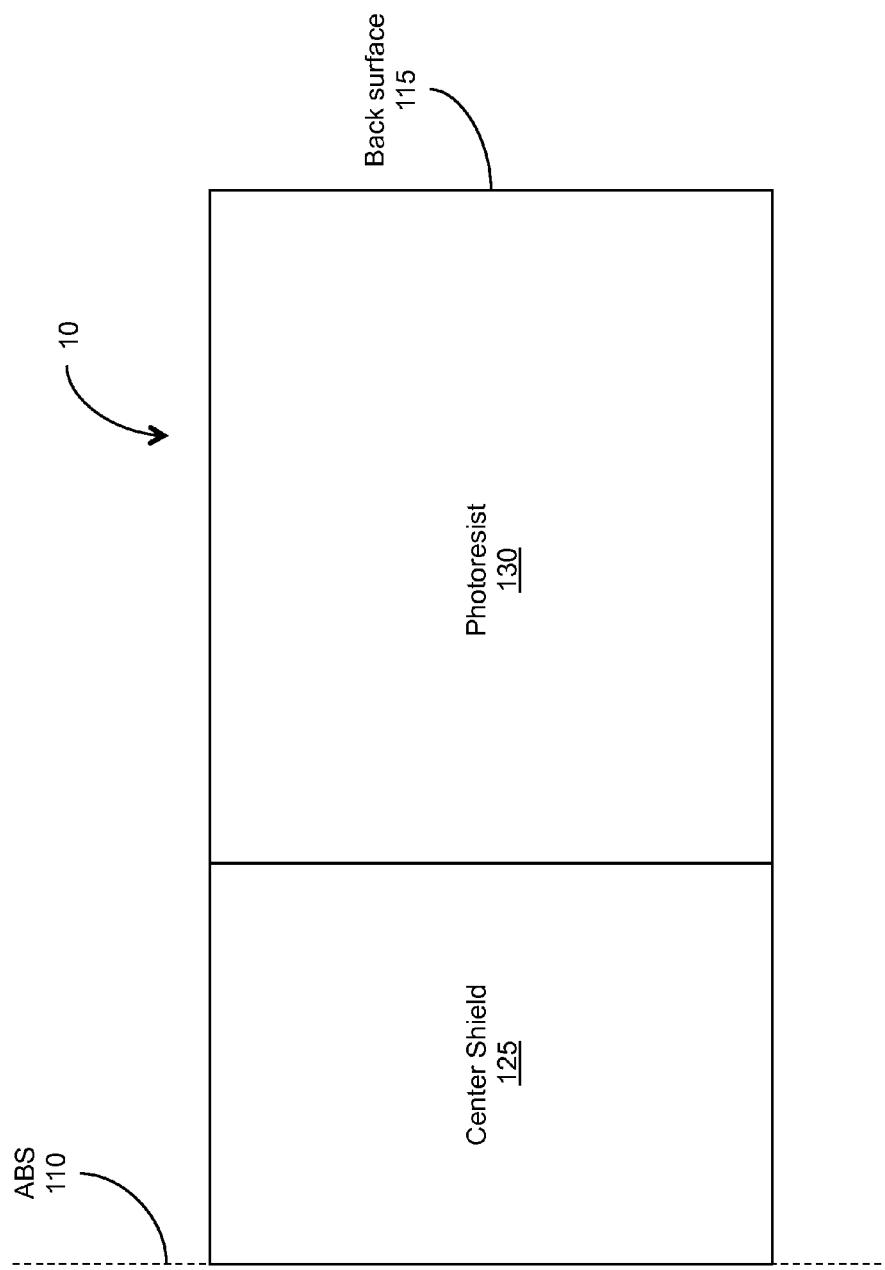

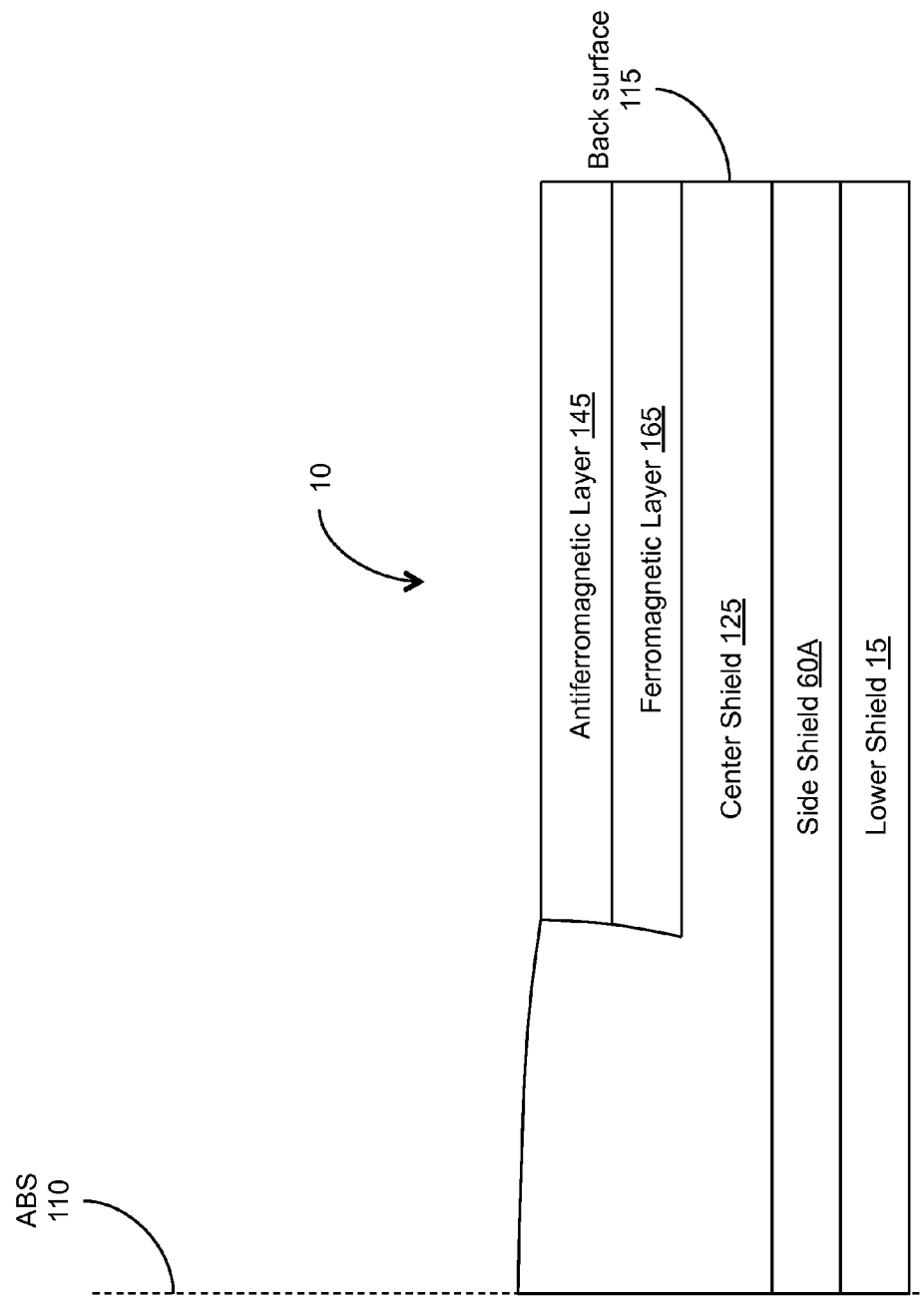

TWO-DIMENSIONAL MAGNETIC RECORDING DEVICE WITH CENTER SHIELD STABILIZED BY RECESSED AFM LAYER

BACKGROUND

Two-dimensional magnetic recording (TDMR) is a storage architecture that promises to increase the areal density of next-generation hard disk drive products. The ultimate goal in TDMR is for the channel bits to be roughly the same size as the magnetic media grains; in other words, each grain on the magnetic medium ideally stores one bit. In theory, by storing one bit per grain of the magnetic medium, TDMR can achieve a density of 10 terabits per square inch on conventional magnetic storage media available in 2015.

The grains of conventional storage media have nonuniform sizes and shapes, and the bit-size-to-grain-size ratio is lower in a TDMR system than in a conventional magnetic recording system. Thus, reading the information stored by a TDMR system is more challenging than reading information stored by a conventional storage system because the highly irregular grain (and, therefore, bit) boundaries cause noise in the read channel, and the tracks are narrow. A TDMR system can recover the stored bits using two-dimensional signal processing techniques if reasonably high-resolution information is available in the cross-track (i.e., from one track to another) and down-track (i.e., along the track being read) dimensions. To obtain such information, a TDMR system can use an array of two or more read elements to create a two-dimensional array of read-back signals, where one dimension is the cross-track dimension, and the other dimension is the down-track dimension. The read sensors can be aligned in the down-track direction (i.e., over the track being read), or they may be offset so that one or more sensors read data from the desired track, and one or more other sensors sense data in adjacent tracks to account for noise.

To provide good TDMR read head performance, it is desirable for the read sensors to be electrically isolated from each other as well as magnetically shielded from each other. A center shield is typically disposed between each pair of read sensors of a TDMR read head to provide the electrical isolation and magnetic shielding. The center shield is typically stabilized using an exchange-biased antiferromagnetic (AFM) layer deposited on the center shield. The thickness of the AFM layer increases the down-track spacing (DTS) between the read sensors and reduces the areal density capability (ADC) of the TDMR read head. Therefore, a challenge in TDMR systems is to reduce the DTS between the sensors in the TDMR read head.

One way to reduce the DTS is to eliminate the AFM layer altogether, but the unstabilized center shield may induce noise on one or both of the read sensors it is designed to shield and isolate, thereby reducing the TDMR read head performance. Another approach to reduce the DTS is to stabilize the center shield using patterned AFM tabs on each side of the center shield instead of an AFM layer deposited on the center shield; however, to preserve the permeability of the side shield and ensure narrow magnetic read width (MRW) of the lower read sensor (i.e., the sensor under the center shield), these tabs need to be placed away from the lower read sensor. When the tabs are far enough from the lower read sensor to preserve the permeability of the side shield and to ensure narrow MRW, the exchange-biased AFM tabs may not effectively stabilize the center shield.

Therefore, there is an ongoing need for approaches that stabilize the center shield while keeping the DTS between read sensors small.

SUMMARY

Disclosed herein are novel TDMR read heads with the AFM layer recessed behind the center shield. Also disclosed are hard disk drives comprising such TDMR read heads and methods to manufacture the TDMR read heads. By recessing the AFM layer away from the air-bearing surface (ABS) of the TDMR read head, the DTS between read sensors is reduced, thereby improving TDMR read head performance.

In some embodiments, a TDMR read head comprises a first read sensor and a center shield over the first read sensor, wherein the center shield has a first thickness at an air-bearing surface (ABS) and a second thickness at a back surface, the first thickness being greater than the second thickness. In some embodiments, the second thickness is zero. The TDMR read head includes a ferromagnetic layer over a portion of the center shield, wherein the ferromagnetic layer is recessed from the ABS. The TDMR read head also includes an antiferromagnetic layer over the ferromagnetic layer and a second read sensor over the antiferromagnetic layer.

In some embodiments, the center shield comprises nickel-iron (NiFe), nickel-iron-molybdenum (NiFeMo), nickel-iron-copper (NiFeCu), nickel-iron-chromium (NiFeCr), or other soft magnetic materials with high magnetic permeability. In some embodiments, the center shield comprises a laminate of at least two materials, such as, for example, NiFe, NiFeMo, NiFeCu, or NiFeCr layers separated from each other by one or more anti-ferromagnetic coupling layers made of a material such as ruthenium (Ru).

In some embodiments, the antiferromagnetic layer comprises iridium (Ir), manganese (Mn), iridium-manganese (IrMn), platinum-manganese (PtMn), nickel-manganese (NiMn), iron-manganese (FeMn), palladium-manganese (PdMn), rhodium-manganese (RhMn), or a combination of these.

In some embodiments, the ferromagnetic layer comprises nickel (Ni), cobalt (Co), iron (Fe), nickel-iron (NiFe), cobalt-iron (CoFe), nickel-iron-chromium (NiFeCr), nickel-iron-molybdenum (NiFeMo), nickel-iron-copper (NiFeCu) cobalt-zirconium-tantalum (CoZrTa), cobalt-zirconium-niobium (CoZrNb), cobalt-iron-zirconium (CoFeZr), or a combination of these.

In some embodiments, the ferromagnetic layer comprises a stitch layer and a nanolayer. In some such embodiments, the stitch layer is made of the same material as the center shield. In some embodiments, the nanolayer comprises, for example, cobalt or cobalt-iron alloys (CoFe).

In some embodiments, the TDMR read head includes an optional insulator layer disposed over the antiferromagnetic layer and an exposed portion of the center shield.

A first method of fabricating a TDMR read head comprises forming a lower read sensor; forming a center shield over the lower read sensor; removing a portion of the center shield so that the center shield has a first thickness at an air-bearing surface (ABS) and a second thickness at a back surface, the first thickness being greater than the second thickness (the second thickness potentially being zero); forming a ferromagnetic layer over a portion of the center shield, wherein the ferromagnetic layer is recessed from the ABS; forming an antiferromagnetic layer over the ferromagnetic layer; and forming an upper read sensor over the antiferromagnetic layer. In some embodiments, the first method also comprises forming an optional insulator layer over the antiferromagnetic layer and an exposed portion of the center shield. In some embodiments, removing the portion of the center shield comprises applying a photoresistive material, and ion milling to remove the portion of the center shield.

In some embodiments, forming the ferromagnetic layer comprises forming a stitch layer and a nanolayer. In some such embodiments, the stitch layer is made of the same material as the center shield. The nanolayer may comprise, for example, cobalt-iron (CoFe) or cobalt.

In some embodiments, the center shield comprises nickel-iron (NiFe), nickel-iron-molybdenum (NiFeMo), nickel-iron-copper (NiFeCu), nickel-iron-chromium (NiFeCr), or other soft magnetic materials with high magnetic permeability. In some embodiments, the center shield comprises a laminate of at least two materials, such as, for example, NiFe, NiFeMo, NiFeCu, or NiFeCr layers separated from each other by one or more anti-ferromagnetic coupling layers made of a material such as ruthenium (Ru).

In some embodiments, the antiferromagnetic layer comprises iridium (Ir), manganese (Mn), iridium-manganese (IrMn), platinum-manganese (PtMn), nickel-manganese (NiMn), iron-manganese (FeMn), palladium-manganese (PdMn), rhodium-manganese (RhMn), or a combination of these.

In some embodiments, the ferromagnetic layer comprises nickel (Ni), cobalt (Co), iron (Fe), nickel-iron (NiFe), cobalt-iron (CoFe), nickel-iron-chromium (NiFeCr), nickel-iron-molybdenum (NiFeMo), cobalt-zirconium-tantalum (CoZrTa), cobalt-zirconium-niobium (CoZrNb), cobalt-iron-zirconium (CoFeZr), or a combination of these.

A second method of fabricating a TDMR read head comprises forming a lower read sensor; forming a center shield over the lower read sensor, the center shield made of a first material; forming a ferromagnetic layer over the center shield; forming an antiferromagnetic layer over the ferromagnetic layer; removing a portion of the antiferromagnetic and ferromagnetic layers proximate an air-bearing surface (ABS) of the TDMR read head to expose a portion of the center shield; depositing additional first material over the exposed portion of the center shield so that the center shield has a first thickness at the ABS and a second thickness at a back surface of the TDMR read head, the first thickness being greater than the second thickness; and forming an upper read sensor over the antiferromagnetic layer.

In some embodiments, the second method further comprises forming an optional insulator layer over the antiferromagnetic layer and the center shield after depositing the additional first material over the exposed portion of the center shield.

In some embodiments, forming the ferromagnetic layer comprises forming a stitch layer and a nanolayer. The stitch layer may be made of the same material as the center shield. The nanolayer may comprise, for example, cobalt-iron (CoFe) or cobalt.

In some embodiments, removing the portion of the antiferromagnetic and ferromagnetic layers proximate the ABS of the TDMR read head comprises applying a photoresistive material over the antiferromagnetic layer proximate the back surface, and ion milling to remove the portions of the antiferromagnetic and ferromagnetic layers proximate the ABS.

In some embodiments, the first material comprises nickel-iron (NiFe), nickel-iron-molybdenum (NiFeMo), nickel-iron-copper (NiFeCu), nickel-iron-chromium (NiFeCr), or other soft magnetic materials with high magnetic permeability. In some embodiments, the center shield comprises a laminate of at least two materials, such as, for example, NiFe, NiFeMo, NiFeCu, or NiFeCr layers separated from each other by one or more anti-ferromagnetic coupling layers made of a material such as ruthenium (Ru).

In some embodiments, the antiferromagnetic layer comprises iridium (Ir), manganese (Mn), iridium-manganese (IrMn), platinum-manganese (PtMn), nickel-manganese (NiMn), iron-manganese (FeMn), palladium-manganese (PdMn), rhodium-manganese (RhMn), or a combination of these.

In some embodiments, the ferromagnetic layer comprises nickel (Ni), cobalt (Co), iron (Fe), nickel-iron (NiFe), cobalt-iron (CoFe), nickel-iron-chromium (NiFeCr), nickel-iron-molybdenum (NiFeMo), cobalt-zirconium-tantalum (CoZrTa), cobalt-zirconium-niobium (CoZrNb), cobalt-iron-zirconium (CoFeZr), or a combination of these.

BRIEF DESCRIPTION OF THE DRAWINGS

The disclosure herein is illustrated by way of example, and not by way of limitation, in the figures of the accompanying drawings, in which like reference numerals refer to similar elements and in which:

FIG. 7A is another throat-cut view of a portion of an incomplete TDMR read head device being fabricated according to the exemplary process illustrated in FIG. 5.

FIG. 7B is a top-down view of the incomplete TDMR read head device illustrated in FIG. 7A.

FIG. 8B is a top-down view of the incomplete TDMR read head device illustrated in FIG. 8A.

FIG. 11B is another throat-cut view of a portion of an incomplete TDMR read head device being fabricated according to the exemplary process illustrated in FIG. 5.

FIG. 12B is a top-down view of the incomplete TDMR read head device illustrated in FIG. 12A.

FIG. 17B is a top-down view of the incomplete TDMR read head device illustrated in FIG. 17A.

FIG. 18A is a throat-cut view of a portion of an incomplete TDMR read head device being fabricated according to the exemplary process illustrated in FIG. 16.

FIG. 19B is a top-down view of the incomplete TDMR read head device illustrated in FIG. 19A.

FIG. 20A is a throat-cut view of a portion of an incomplete TDMR read head device being fabricated according to the exemplary process illustrated in FIG. 16.

FIG. 20B is a top-down view of the incomplete TDMR read head device illustrated in FIG. 20A.

FIG. 22A is a throat-cut view of a portion of an incomplete TDMR read head device being fabricated according to the exemplary process illustrated in FIG. 16.

DETAILED DESCRIPTION

The following description is made for the purpose of illustrating the general principles of the present disclosure and is not meant to limit the inventive concepts claimed herein. Furthermore, particular features described herein can be used in combination with other described features in various possible combinations and permutations.

Figure 1:
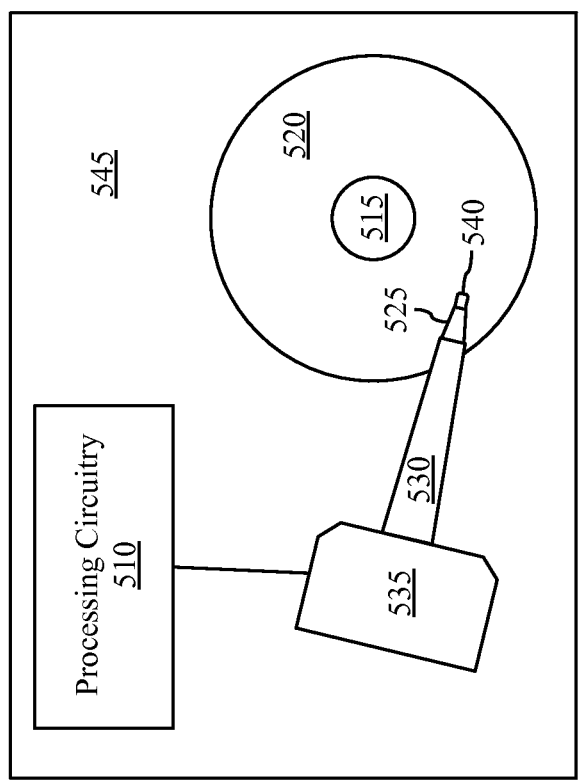
FIG. 1 illustrates several components of an exemplary hard disk drive in accordance with some embodiments.
Figure 2:
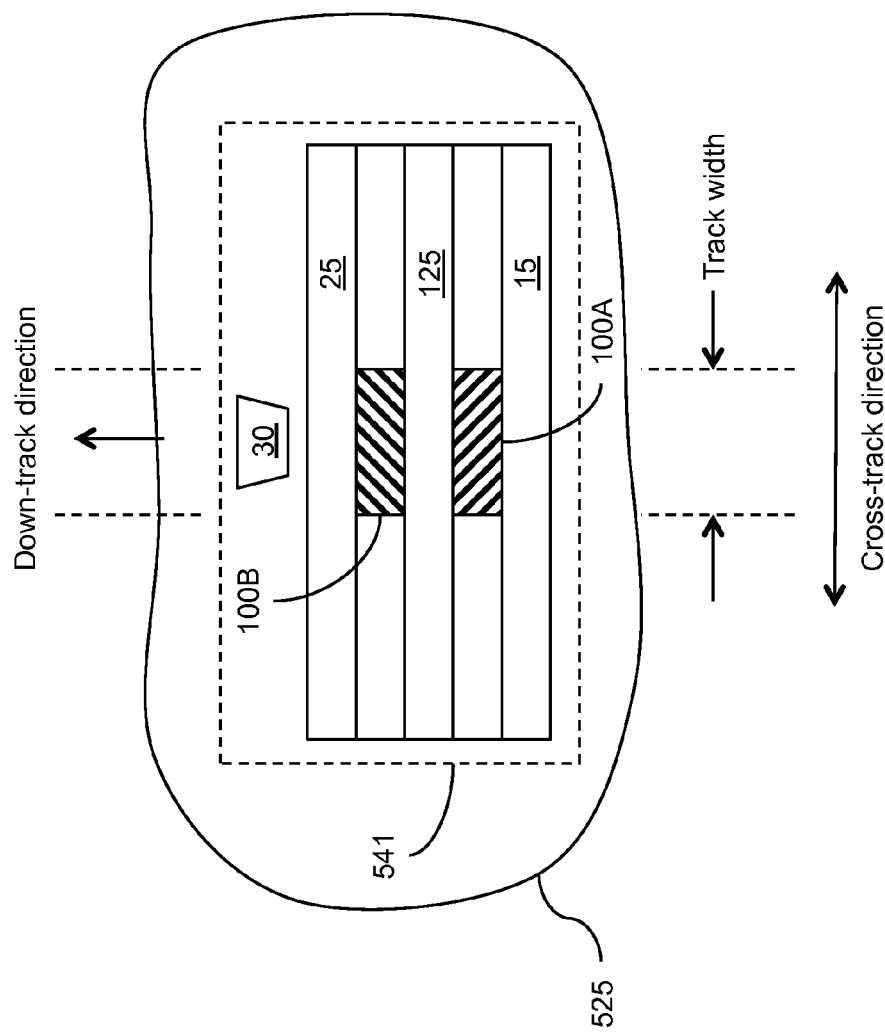
FIG. 2 is an ABS view showing an exemplary TDMR read/write head in accordance with some embodiments.

FIG. 1 illustrates several components of an exemplary hard disk drive in accordance with some embodiments. A magnetic hard disk drive 500 includes a spindle 515 that supports and rotates a magnetic disk 520. The spindle 515 is rotated by a spindle motor (not shown) that is controlled by a motor controller (not shown) that may be implemented in electronics of the hard disk drive 500. A slider 525, which is supported by a suspension and actuator arm 530, has a combined read and write magnetic head 540. In some embodiments, the read/write magnetic head 540 is a TDMR read/write head 541, one embodiment of which is illustrated in FIG. 2. The suspension and actuator arm 530 is rotatably positioned over the magnetic disk 520 by an actuator 535. The head 540 may include one or more giant magnetoresistance (GMR) sensors, tunneling magnetoresistance (TMR) sensors, or another type of magnetoresistive sensor. The components of the hard disk drive 500 may be mounted on a housing 545. It is to be understood that although FIG. 1 illustrates a single disk 520, a single slider 525, a single head 540, and a single suspension and actuator arm 530, hard disk drive 500 may include a plurality (i.e., more than one) of disks 520, sliders 525, heads 540, and suspension and actuator arms 530.

In operation, the actuator 535 moves the suspension and actuator arm 530 to position the slider 525 so that the magnetic head 540 is in a transducing relationship with the surface of the magnetic disk 520. When the spindle motor rotates the disk 520, the slider 525 is supported on a thin cushion of air known as the air bearing that exists between the surface of the disk 520 and an air-bearing surface (ABS) of the head 540. The head 540 may be used to write information to multiple tracks on the surface of the disk 520 and to read previously-recorded information from the tracks on the surface of the disk 520. Processing circuitry 510 provides signals representing information to be written to the disk 520 to the head 540 and receives signals representing information read from the disk 520 from the head 540. Processing circuitry 510 also provides signals to the spindle motor to rotate the magnetic disk 520, and to the actuator 535 to move the slider 525 to various tracks.

To read information from the magnetic disk 520, the head 540 passes over a region of the disk 520 and detects changes in resistance due to magnetic field variations recorded on the disk 520, which represent the recorded bits.

FIG. 2 is an ABS view (i.e., the view from the surface of the disk 520) of an exemplary TDMR read/write head 541 in accordance with some embodiments. The TDMR read/write head 541 is comprised of a series of thin films deposited and lithographically patterned on the trailing surface of slider 525 using thin film head fabrication techniques. The writing portion of the TDMR read/write head 541 includes a magnetic write pole 30 and may also include trailing and/or side shields (not shown).

In the embodiment illustrated in FIG. 2, the read head portion of the TDMR read/write head 541 is shown as a sensor structure of stacked multiple read sensors 100A, 100B for use in a disk drive supporting TDMR. In the illustrated embodiment, both read sensors 100A, 100B are aligned with one another (vertically in FIG. 2) so as to read the same data track having a certain track width. Sensors 100A and 100B may alternatively be laterally offset from each other to adjust for skew, to read different portions of the same track, or to read separate tracks. As illustrated in FIG. 2, the sensors 100A and 100B are the same size; alternatively, the sensors 100A, 100B may have different widths in the cross-track or down-track directions. The widths of the sensors 100A, 100B may be based on the track pitch (i.e., the distance from the center of one track to the center of an adjacent track). Furthermore, although FIG. 2 illustrates TDMR read/write head 541 as having only two sensors, 100A and 100B, the TDMR read/write head 541 may include additional sensors 100 in the down-track direction or in the cross-track direction. These additional sensors 100 may be similar to sensors 100A and 100B in composition and size, or they may have different compositions or sizes. Similarly, these additional sensors 100 may be aligned with one or both of sensors 100A, 100B, or they may be offset from one of both of sensors 100A, 100B.

For convenience, the sensor 100A is referred to herein as the "lower read sensor 100A," and the sensor 100B is referred to as the "upper read sensor 100B." It is to be understood that the terminology "upper" and "lower" is merely for convenience, and the examples herein include only two sensors 100 to simplify the description. As explained above, the TDMR read/write head 541 may include additional sensors 100, and sensors 100A and 100B may be in a different relationship than sensors 100A and 100B shown in FIG. 2. For example, sensors 100 may be located next to each other or in any other configuration, which configuration may include more sensors than 100A and 100B. The center shield 125 disclosed herein can be disposed between any two read sensors 100 in a TDMR read/write head 541. As illustrated in the exemplary embodiment of FIG. 2, lower read sensor 100A is located between two magnetic shields, lower shield 15 and center shield 125. Upper read sensor 100B is also located between two magnetic shields, center shield 125 and upper shield 25. The shields 15, 25, and 125 are formed of magnetically permeable material and are also electrically conductive so that they can function as the electrical leads to the read sensors 100A and 100B. The shields prevent or reduce the likelihood that the read sensors 100A and 100B read recorded data that neighbors the data being read. Typically, lower shield 15 and upper shield 25 may each be up to several microns thick in the down-track direction, whereas the total thickness of each read sensor 100A, 100B in the down-track direction is typically in the range of 20 to 40 nm.

Figure 3:
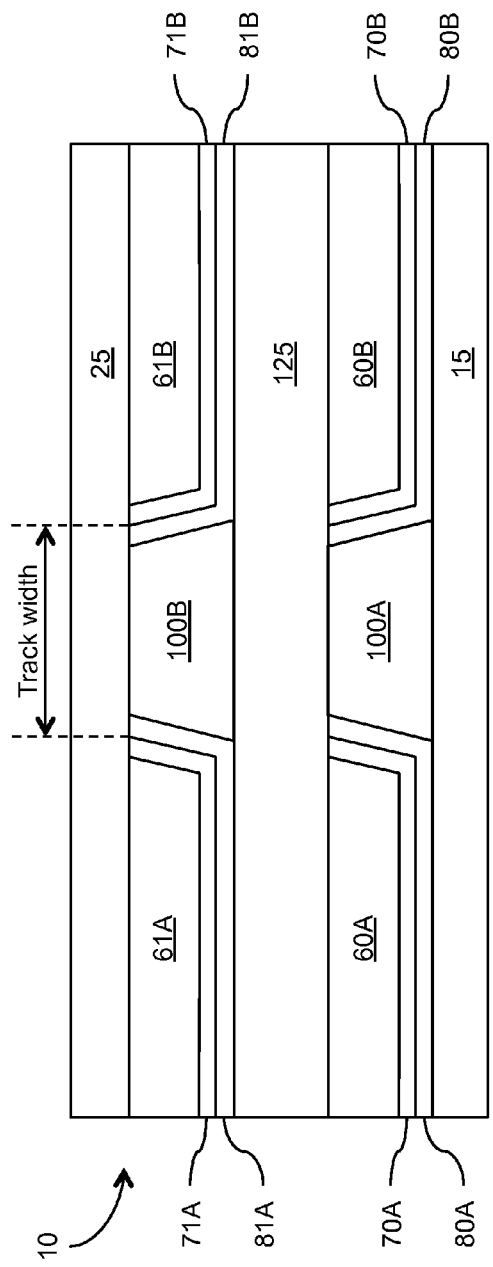
FIG. 3 is an ABS view of the layers making up a TDMR read sensor in accordance with some embodiments.

FIG. 3 is an ABS view of the layers making up a TDMR read head 10 structure in accordance with some embodiments. The layers shown in FIG. 3 are not necessarily drawn to scale. FIG. 3 illustrates a stacked current-perpendicular-to-the-plane (CPP) sensor structure, but the disclosures herein apply as well to other types of sensors, such as, for example, current-in-plane (CIP) sensors. As shown in FIG. 3, the lower read sensor 100A is aligned along the same track width as the upper read sensor 100B, but, as explained above, the two sensors could be laterally misaligned, for example, to adjust for skew, to read different portions of the same data track, or to read adjacent tracks. Likewise, although the lower read sensor 100A and upper read sensor 100B are illustrated in FIG. 3 as being the same size, as explained above, their sizes may be different in the cross-track and/or down-track directions. The lower read sensor 100A is over lower shield 15, which is over the slider substrate (not shown), i.e., the trailing surface of the slider 525.

Figure 4:
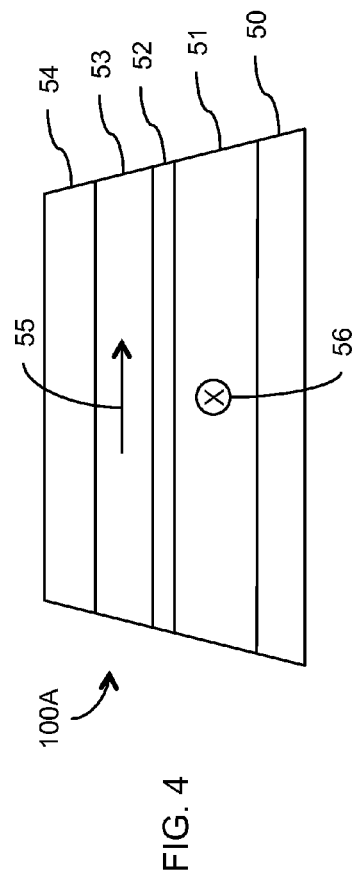
FIG. 4 illustrates exemplary layers of a TDMR read sensor in accordance with some embodiments.

FIG. 4 shows various layers of the read sensor 100A in accordance with some embodiments. The layers of the read sensor 100A are not necessarily drawn to scale. As illustrated in FIG. 4, the layers of sensor 100A include a reference or pinned ferromagnetic layer 51 having a fixed magnetic moment or magnetization direction 56 oriented orthogonal to the ABS (into the page), a free ferromagnetic layer 53 having a magnetic moment or magnetization direction 55 oriented substantially parallel to the ABS but that can rotate in the plane of the free layer 53 in response to transverse external magnetic fields from the disk 520, and a nonmagnetic spacer layer 52 between the pinned layer 51 and the free layer 53. The sensor 100A may be a CPP-GMR sensor, in which case the nonmagnetic spacer layer 52 is made of an electrically conducting material, typically a metal such as Cu or Ag, or AgSn alloy. Alternatively, the sensor 100A may be a CPP tunneling magnetoresistive (CPP-TMR) sensor, in which case the nonmagnetic spacer layer 52 may be a tunnel barrier formed of an electrically insulating material, such as, for example, titanium dioxide ($TiO_2$), magnesium oxide (MgO), or aluminum oxide ($Al_2O_3$). The pinned layer 51 may have its magnetization direction pinned substantially orthogonal to the ABS by being exchange-coupled to an antiferromagnetic (AF) layer 50. The AF layer 50 may be made of a manganese (Mn) alloy, e.g., PtMn, NiMn, FeMn, IrMn, PdMn, PtPdMn, or RhMn. The pinned layer 51 may be a simple pinned or an antiparallel pinned structure. A nonmagnetic capping layer 54, which may be a single layer or multiple layers of different materials, such as ruthenium (Ru), tantalum (Ta), or titanium (Ti), may optionally be located above the free layer 53 to provide corrosion protection and to adjust the free layer 53 to shield spacing.

In the presence of an external magnetic field in the range of interest, i.e., magnetic fields from recorded data on the disk 520, the magnetization direction 55 of the free layer 53 rotates, whereas the magnetization direction 56 of the pinned layer 51 remains fixed and does not rotate. Thus, when a sense current is applied from the top shield 54 perpendicularly through the sensor 100A layers, the magnetic fields from the recorded data on the disk cause rotation of the free-layer magnetization 55 relative to the pinned-layer magnetization 56, which is detectable as a change in electrical resistance.

Although the free layer 53 is shown in FIG. 4 as a single layer, the free layer 53 may include multiple layers, such as, for example, provided by a synthetic antiferromagnetic (SAF) structure. Likewise, although the pinned layer 51 is also shown as a single layer, it may have a multilayer structure.

Referring again to FIG. 3, side shields 60A, 60B, which are made of soft magnetic material, are formed outside of the sensor 100A near the side edges of the sensor 100A, particularly near the side edges of free layer 53. The side shields 60A, 60B longitudinally bias the magnetization 55 of the free layer 53. Seed layers 70A, 70B are located below the side shields 60A, 60B, and insulating layers 80A, 80B are located below the seed layers 70A, 70B. The seed layers 70A, 70B and side shields 60A, 60B are electrically insulated from the side edges of the sensor 100A by electrically insulating layers 80A, 80B, which may be made of aluminum oxide ($Al_2O_3$), a silicon nitride ($Si_3N_4$), or another metal oxide such as, for example, a tantalum oxide or a titanium oxide. The side shields 60A, 60B are formed of "soft" magnetic material, meaning material that can be easily magnetized and demagnetized at low magnetic fields. The soft magnetic material may be any of the well-known materials used for conventional magnetic shields, such as, for example, an alloy comprising nickel (Ni) and iron (Fe). Alternatively, other soft ferromagnetic materials may be used, such as, for example, NiFeCr, NiFeMo, NiFeCu, CoZrTa, CoZrNb, or CoFeZr alloys.

Upper read sensor 100B is similar in structure and function to lower read sensor 100A. As mentioned elsewhere, upper read sensor 100B may be the same size as lower read sensor 100A, or it may have different dimensions. Like lower read sensor 100A, upper read sensor 100B comprises an antiferromagnetic layer, a pinned layer with its magnetization orthogonally pinned to the ABS, a spacer layer, a free layer with its magnetization oriented substantially parallel to the ABS but free to rotate, and (optionally) a nonmagnetic cap layer. The discussion of these layers is provided above in the discussion of lower read sensor 100A. Like lower read sensor 100A, upper read sensor 100B is sandwiched by side shields 61A, 61B, seed layers 71A, 71B, and insulating layers 81A, 81B. The side shields 61A, 61B, seed layers 71A, 71B, and insulating layers 81A, 81B may have the same structure, composition, and function as previously described for lower read sensor 100A.

Center shield 125 is a shared shield between lower read sensor 100A and upper read sensor 100B. Center shield 125 electrically isolates sensors 100A, 100B from each other and magnetically shields the sensors 100A, 100B from each other. As stated above, for a number of reasons, it is desirable to minimize the distance between the upper read sensor 100B and the lower read sensor 100A. One reason is to mitigate the effects of head skew, which is a result of the rotary actuator 535 not moving the TDMR read/write head 541 perfectly radially across the tracks of the disk 520. Near the outside diameter of the disk 520, the skew angle may be positive, whereas closer to the center of the disk 520, the skew angle may be negative. Whenever the skew angle is nonzero, the read sensors in a multi-sensor array (e.g., the read sensors 100A, 100B illustrated in FIG. 2 and FIG. 3) may be misaligned relative to the track they are intended to sense (regardless of whether the sensors are intended to sense the same track or different tracks). As a result, the read sensors may not perform as desired at all skew angles. Head skew is most pronounced near the inner and outer diameters of the disk 520 (see FIG. 1). To mitigate the effects of head skew in TDMR, the center shield 125, and any layers used to stabilize the center shield 125, should be made as thin as possible without substantially degrading shielding and resolution.

Figure 5:
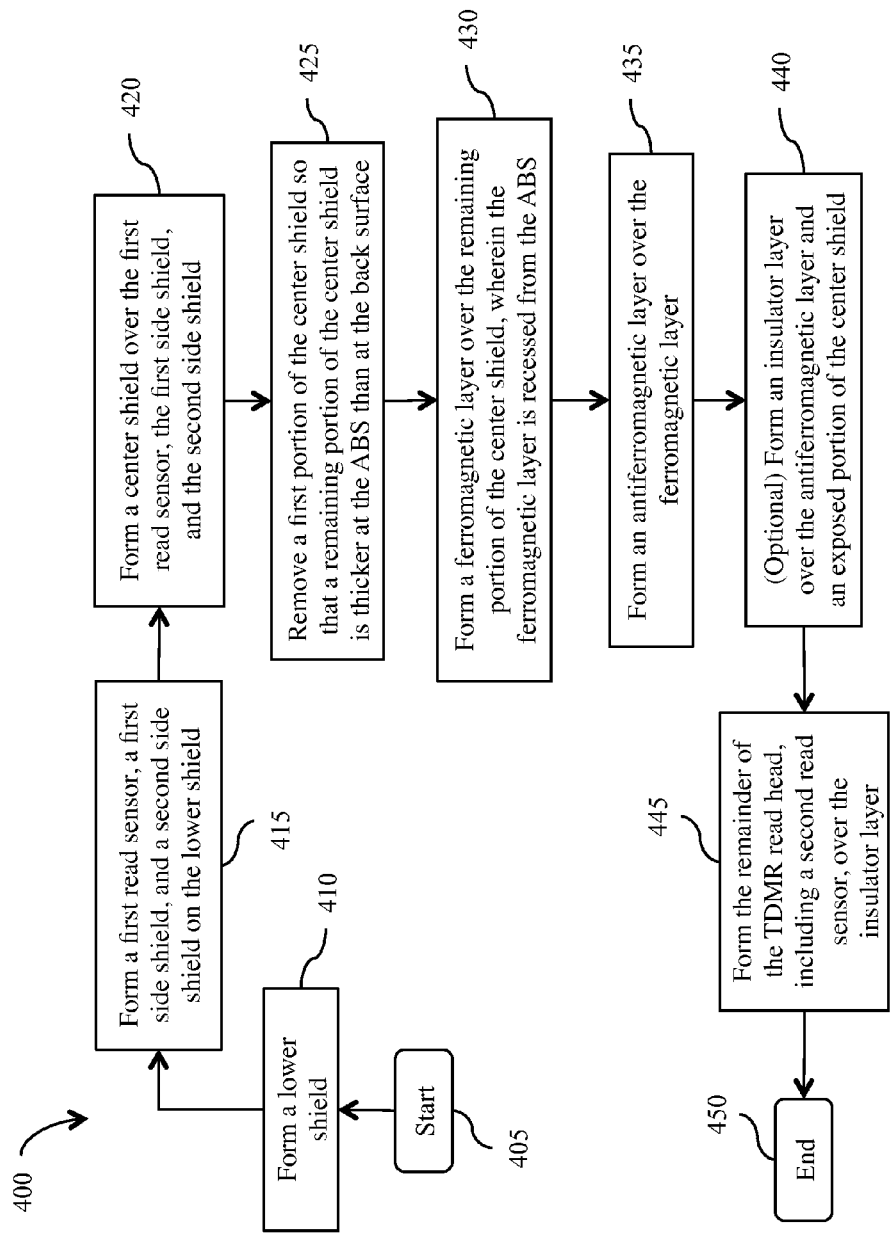
FIG. 5 is a flowchart of a process to fabricate a TDMR read head in accordance with some embodiments.

FIG. 5 illustrates a process 400 of fabricating a TDMR read head 10 (i.e., a portion of the TDMR read/write head 541) having two read sensors separated by a center shield that is stabilized by a recessed AFM layer in accordance with some embodiments. FIGS. 6A through 15 illustrate the incomplete TDMR read head 10 at various stages of fabrication according to the process 400 of FIG. 5. It is to be understood that the layers and dimensions of the various layers of the TDMR read head 10 shown in FIGS. 6A to 15 are not necessarily to scale.

Referring to FIG. 5, at 405, the process 400 begins. At step 410, a lower shield (e.g., lower shield 15 shown in FIG. 2 or FIG. 3) is formed on a substrate (e.g., a substrate of slider 525). At step 415, a first read sensor (e.g., the lower read sensor 100A shown in FIG. 2 or FIG. 3) is formed on the lower shield between a first side shield and a second side shield (e.g., side shields 60A and 60B shown in FIG. 2 or FIG. 3). The lower shield 15, lower read sensor 100A, and side shields 60A and 60B can be formed using conventional fabrication techniques and conventional materials, and their sizes and thicknesses can be conventional.

Figure 6A:
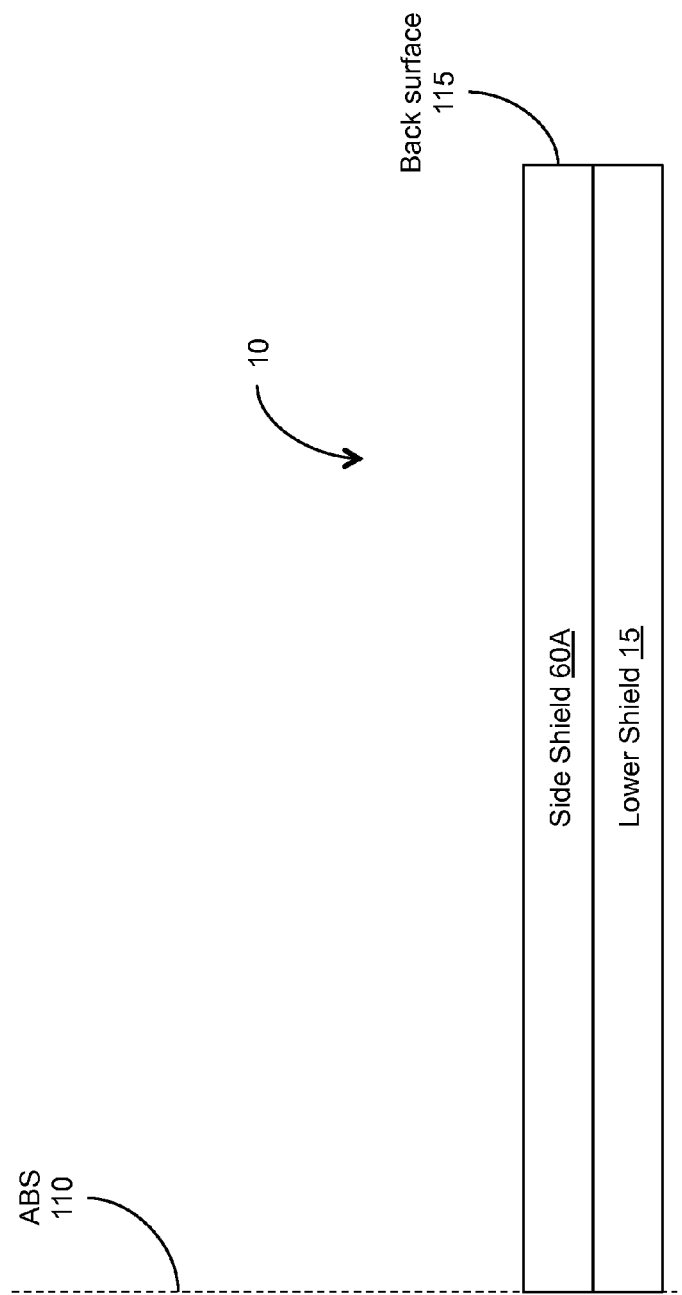
FIG. 6A is a throat-cut view of a portion of an incomplete TDMR read head device being fabricated according to the exemplary process illustrated in FIG. 5.
Figure 6B:
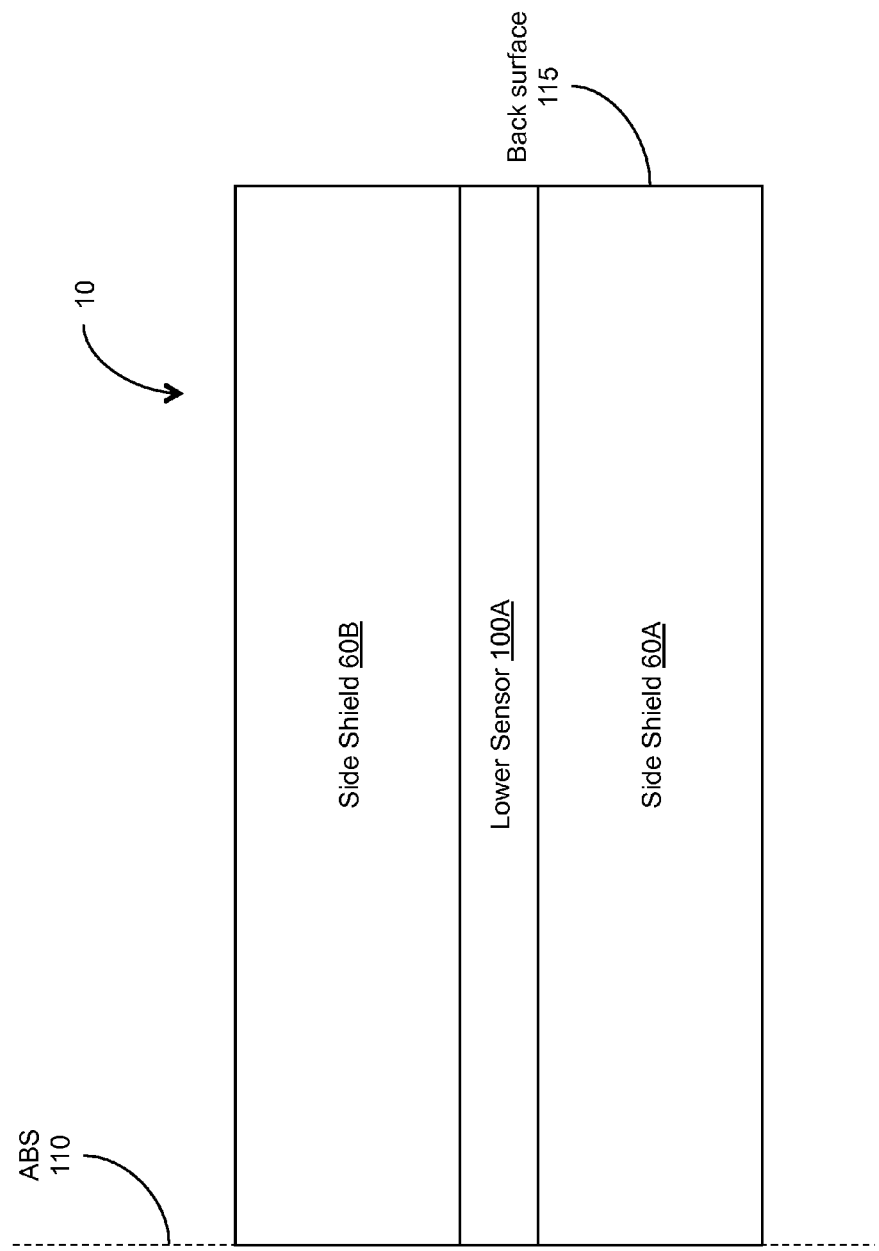
FIG. 6B is a top-down view of the incomplete TDMR read head device illustrated in FIG. 6A.

FIG. 6A is a throat cut view of a portion of the incomplete TDMR read head 10 through one of the side shields (side shield 60A) after the lower read sensor 100A and the side shields 60A and 60B have been fabricated over the lower shield 15 (i.e., after steps 410 and 415 of FIG. 5). FIG. 6A identifies the air-bearing surface (ABS) 110 and the back surface 115 of the incomplete TDMR read head 10. FIG. 6B illustrates the top-down view of the incomplete TDMR read head 10 illustrated in FIG. 6A. FIG. 6B shows the lower read sensor 100A between side shields 60A and 60B.

Referring again to FIG. 5, at step 420, a center shield (e.g., center shield 125 shown in FIG. 2 or FIG. 3) is formed over the first read sensor 100A and the first and second side shields 60A, 60B. The center shield 125 may be formed of any suitable material. In some embodiments, the center shield 125 is made of nickel-iron (NiFe), nickel-iron-molybdenum (NiFeMo), nickel-iron-copper (NiFeCu), nickel-iron-chromium (NiFeCr), or other soft magnetic materials with high magnetic permeability. In some embodiments, the center shield 125 has a laminated structure comprising at least two materials, such as, for example, NiFe layers separated from each other by anti-ferromagnetic coupling layers such as ruthenium (Ru). If the center shield 125 is made of NiFe, the center shield 125 may be fabricated by depositing alternating thin layers of nickel and iron.

FIG. 7A is a throat-cut view of a portion of the in-fabrication TDMR read head 10 after step 420 of FIG. 5. The center shield 125 may have any suitable thickness but may typically be in the range of 75 Angstroms to 500 Angstroms. A thickness of 180 Angstroms has been found to be advantageous. FIG. 7B is the top-down view of the TDMR read head 10 corresponding to FIG. 7A.

Referring again to FIG. 5, at step 425, a portion of the center shield 125 is removed so that a remaining portion of the center shield 125 has a first thickness at the ABS that is greater than a second thickness at the back surface of the read head 10. The removal of the portion of the center shield 125 can be accomplished using well-known, conventional techniques, such as, for example, applying photoresistive material or a hard mask and ion-milling or etching to remove the portion of the center shield 125.

Figure 8A:
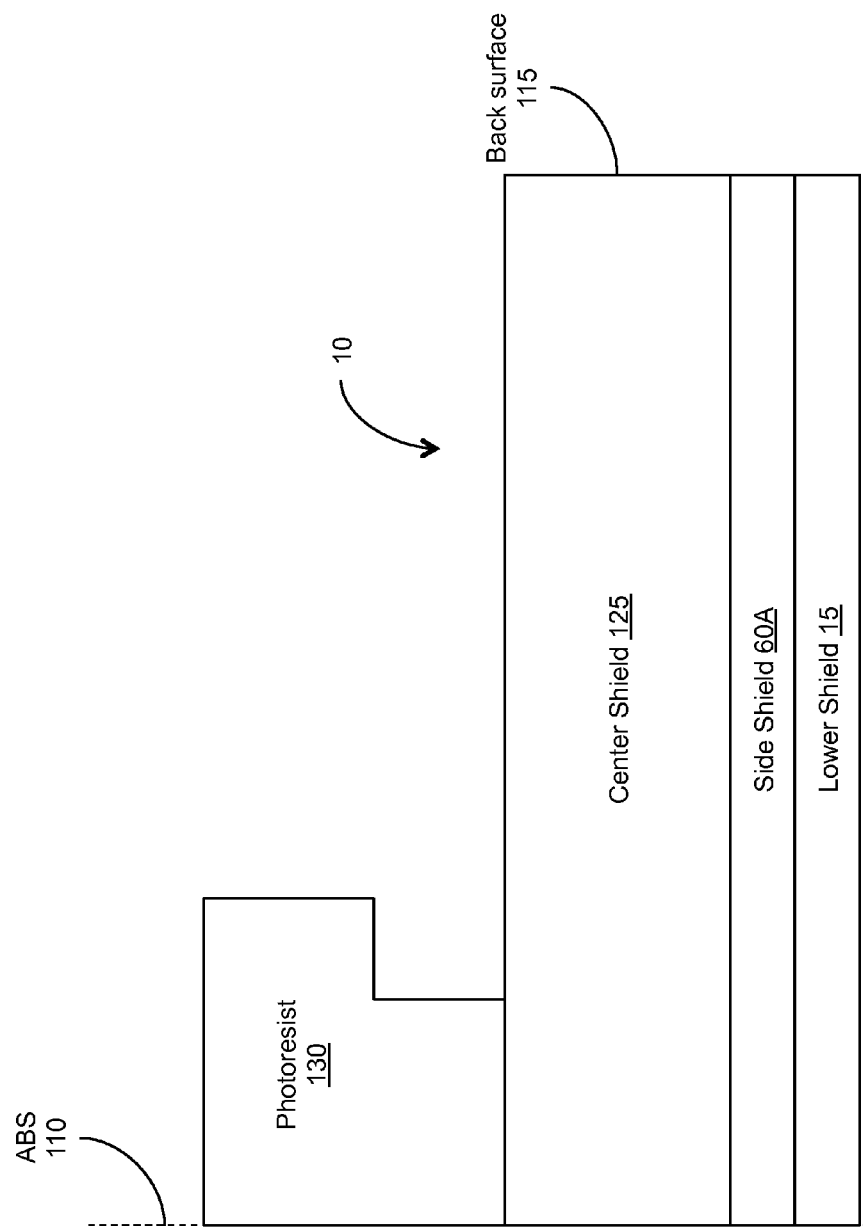
FIG. 8A is another throat-cut view of a portion of an incomplete TDMR read head device being fabricated according to the exemplary process illustrated in FIG. 5.

FIG. 8A is a throat-cut view of the incomplete TDMR read head 10 before the portion of the center shield 125 has been removed in step 425. As shown in the embodiment illustrated in FIG. 8A, photoresistive material 130 has been deposited over an area of the center shield 125 near the ABS 110 of the TDMR read head 10. The photoresistive material 130 can be any conventional material that protects the portion of the center shield 125 near the ABS 110 while another portion of the center shield 125 closer to the back surface 115 is being removed (e.g., by etching or ion milling). A hard mask or other well-known techniques to lithographically define a region of the TDMR read head 10 to be protected during a subsequent fabrication step could be used instead of the exemplary photoresistive material 130 shown in FIG. 8A.

FIG. 8B is a top-down view of the incomplete TDMR read head 10 after the photoresistive material 130 has been deposited as illustrated in FIG. 8A.

Figure 9A:
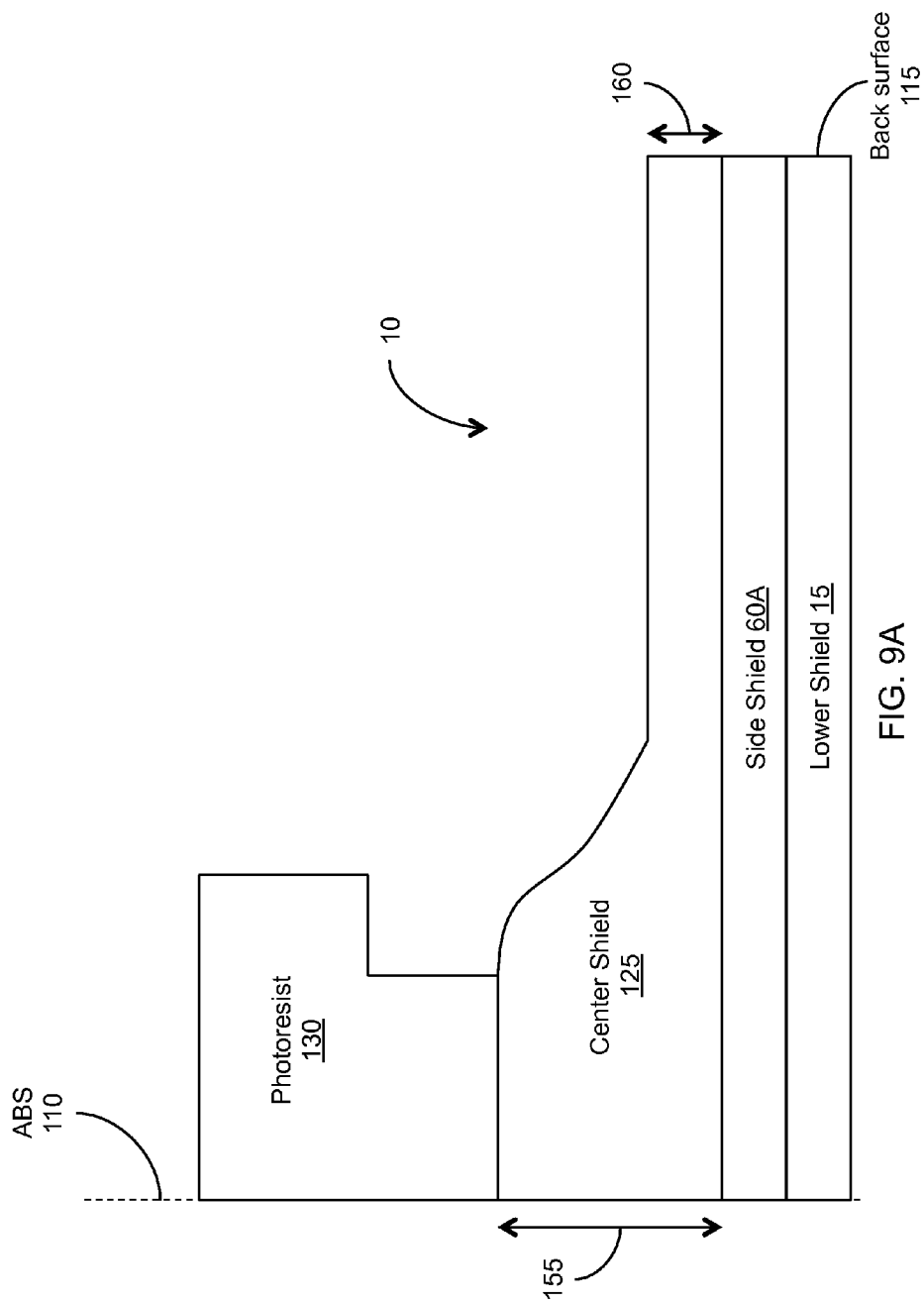
FIG. 9A is another throat-cut view of a portion of an incomplete TDMR read head device being fabricated according to the exemplary process illustrated in FIG. 5.

FIG. 9A is a throat-cut view of the incomplete TDMR read head 10 after the portion of the center shield 125 closer to the back surface 115 has been removed. As shown in FIG. 9A, after the removal, the center shield 125 has a first thickness 155 at the ABS 110 that is greater than a second thickness 160 at the back surface 115. The first thickness 155 may be, for example, 75 Angstroms to 500 Angstroms, whereas the second thickness 160 may be, for example, from zero to 450 Angstroms. A center shield 125 having a first thickness 155 of around 200 Angstroms and a second thickness 160 of around 100 Angstroms has been found to be advantageous.

Figure 9B:
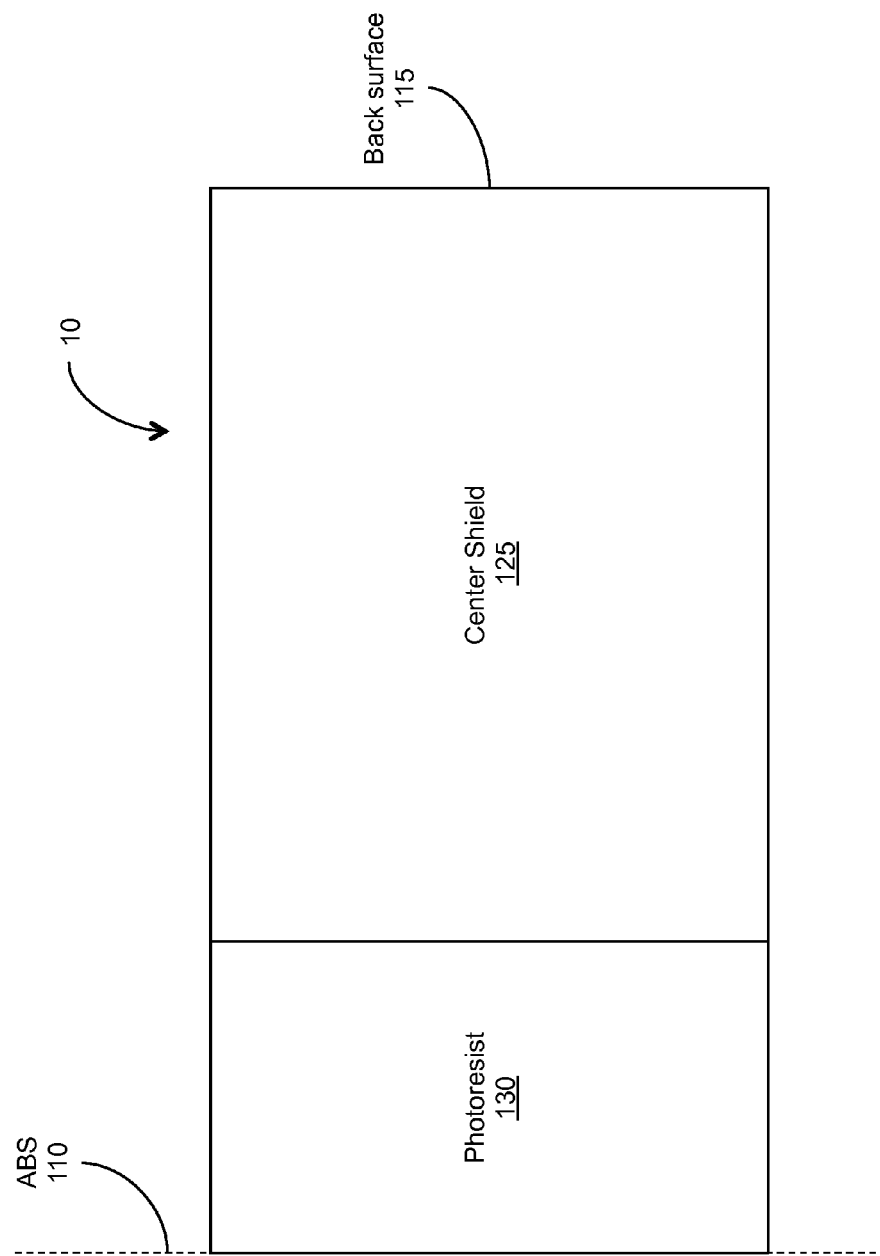
FIG. 9B is a top-down view of the incomplete TDMR read head device illustrated in FIG. 9A.

FIG. 9B is a top-down view of the incomplete TDMR read head 10 after the portion of the center shield 125 has been removed in step 425 of FIG. 5.

Figure 10A:
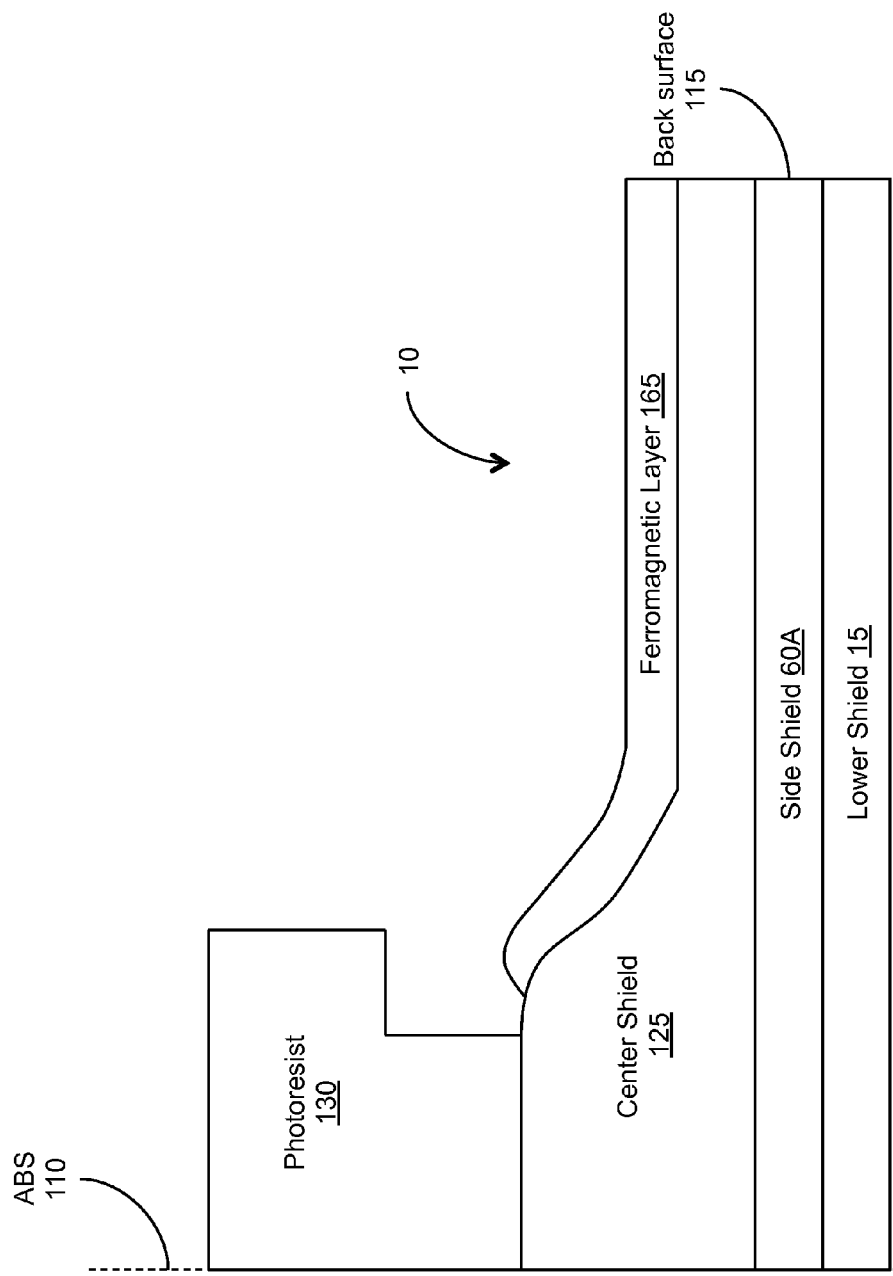
FIG. 10A is another throat-cut view of a portion of an incomplete TDMR read head device being fabricated according to the exemplary process illustrated in FIG. 5.
Figure 10B:
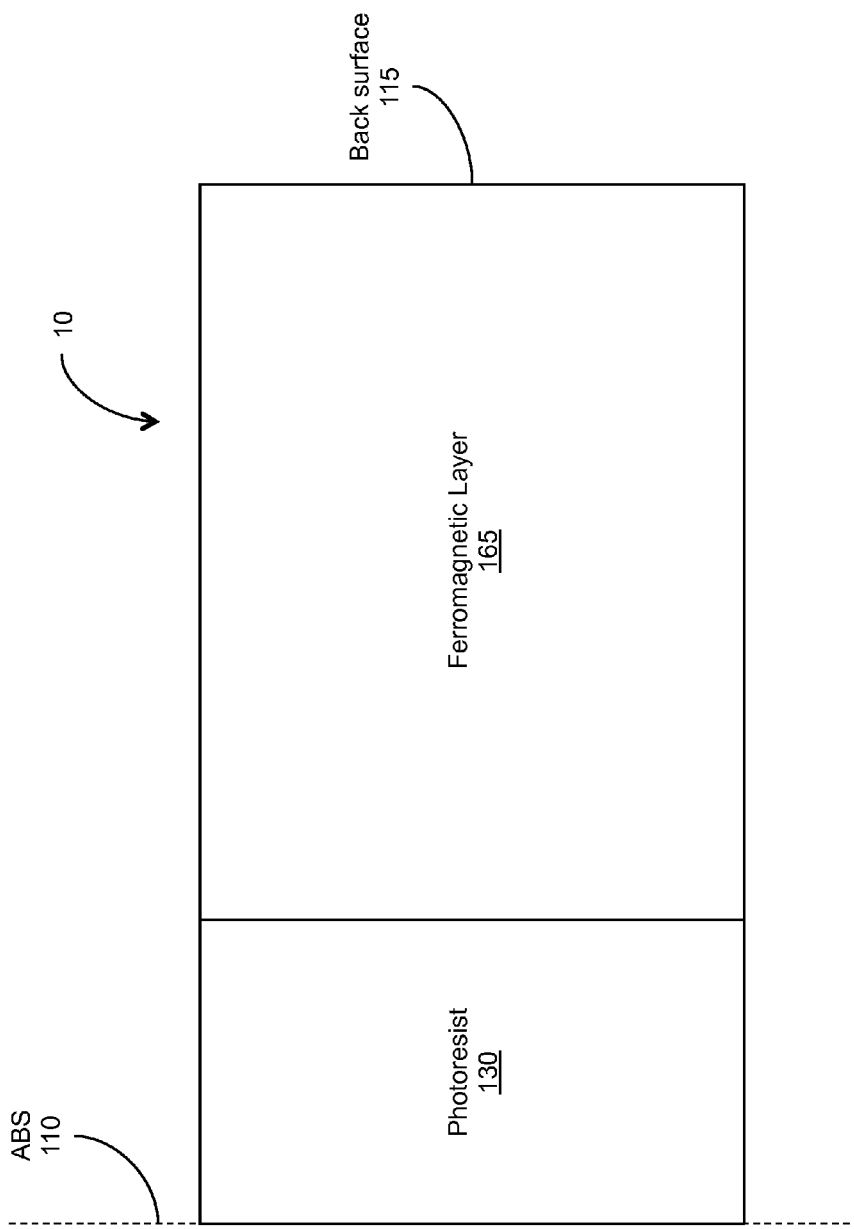
FIG. 10B is a top-down view of the incomplete TDMR read head device illustrated in FIG. 10A.

Referring again to FIG. 5, at step 430, a ferromagnetic layer 165 is formed over the remaining portion of the center shield 125. FIG. 10A is a throat-cut view of the incomplete TDMR read head 10 after the ferromagnetic layer 165 has been formed, and FIG. 10B is the corresponding top-down view. Because the ferromagnetic layer 165 is deposited while the photoresistive material 130 (or other suitable protective mechanism) is in place, the ferromagnetic layer 165 is recessed from the ABS 110, as shown in FIG. 10A. The ferromagnetic layer 165 may be made of any suitable material, such as, for example, nickel (Ni), cobalt (Co), iron (Fe), nickel-iron (NiFe), cobalt-iron (CoFe), nickel-iron-chromium (NiFeCr), nickel-iron-molybdenum (NiFeMo), cobalt-zirconium-tantalum (CoZrTa), cobalt-zirconium-niobium (CoZrNb), cobalt-iron-zirconium (CoFeZr), or a combination of these. The ferromagnetic layer 165 may have any suitable thickness, for example, between 10 and 50 Angstroms. A thickness of around 20 Angstroms has been found to be advantageous.

Figure 11A:
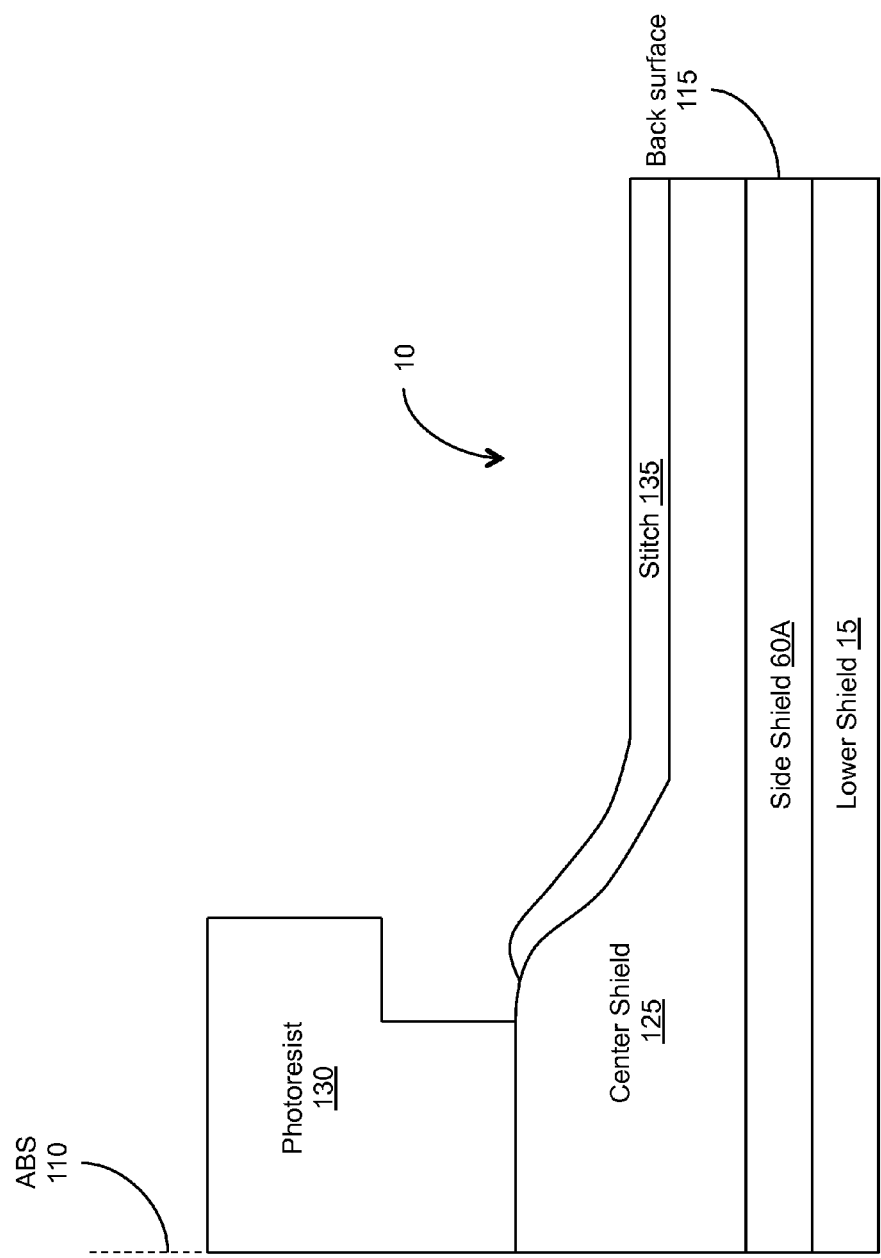
FIG. 11A is another throat-cut view of a portion of an incomplete TDMR read head device being fabricated according to the exemplary process illustrated in FIG. 5.

In some embodiments, the ferromagnetic layer 165 includes a stitch layer 135 and a nanolayer 140. In other embodiments, the ferromagnetic layer 165 does not include a stitch layer 135 or a nanolayer 140. FIGS. 11A and 11B illustrate an embodiment in which the ferromagnetic layer 165 includes a stitch layer 135 and a nanolayer 140. FIG. 11A is a throat-cut view of an embodiment of the incomplete TDMR read head 10 after a stitch layer 135 has been formed over a portion the center shield 125. As shown in FIG. 11A, the stitch layer 135 is recessed from the ABS 110 of the TDMR read head 10. The stitch layer 135 may be made of any suitable material, such as, for example, nickel (Ni), cobalt (Co), iron (Fe), nickel-iron (NiFe), cobalt-iron (CoFe), nickel-iron-chromium (NiFeCr), nickel-iron-molybdenum (NiFeMo), nickel-iron-copper (NiFeCu), cobalt-zirconium-tantalum (CoZrTa), cobalt-zirconium-niobium (CoZrNb), cobalt-iron-zirconium (CoFeZr), or a combination of these. In some embodiments, the stitch layer 135 is made of the same material as the center shield 125. The stitch layer 135 may have any suitable thickness, such as, for example, between 10 and 50 Angstroms. A thickness of around 20 Angstroms has been found to be advantageous.

FIG. 11B is a throat-cut view of an incomplete TDMR read head 10 after a nanolayer 140 has been formed over the stitch layer 135. The nanolayer 140 may be made of any suitable material, such as, for example, nickel (Ni), cobalt (Co), iron (Fe), nickel-iron (NiFe), cobalt-iron (CoFe), nickel-iron-chromium (NiFeCr), nickel-iron-molybdenum (NiFeMo), nickel-iron-copper (NiFeCu), cobalt-zirconium-tantalum (CoZrTa), cobalt-zirconium-niobium (CoZrNb), cobalt-iron-zirconium (CoFeZr), or a combination of these. In some embodiments, the nanolayer 140 promotes exchange biasing of the antiferromagnetic layer 145 that is subsequently deposited as described below. The nanolayer 140 may have any suitable thickness, such as, for example, between 3 and 10 Angstroms. A thickness of around 5 Angstroms has been found to be advantageous.

Referring again to FIG. 5, at step 435, an antiferromagnetic layer 145 is formed over the ferromagnetic layer 165. The antiferromagnetic layer 145 may be made of any suitable material, such as, for example, iridium and manganese. For example, the antiferromagnetic layer 145 may be an alloy such as IrMn (where Mn is between about 70 and 85 atomic percent), or any other antiferromagnetic material, such as, for example, PtMn, NiMn, FeMn, PdMn, PtPdMn, or RhMn. The antiferromagnetic layer 145 may have any suitable thickness, for example, between 60 and 100 Angstroms. A thickness of around 80 Angstroms has been found to be advantageous.

Figure 12A:
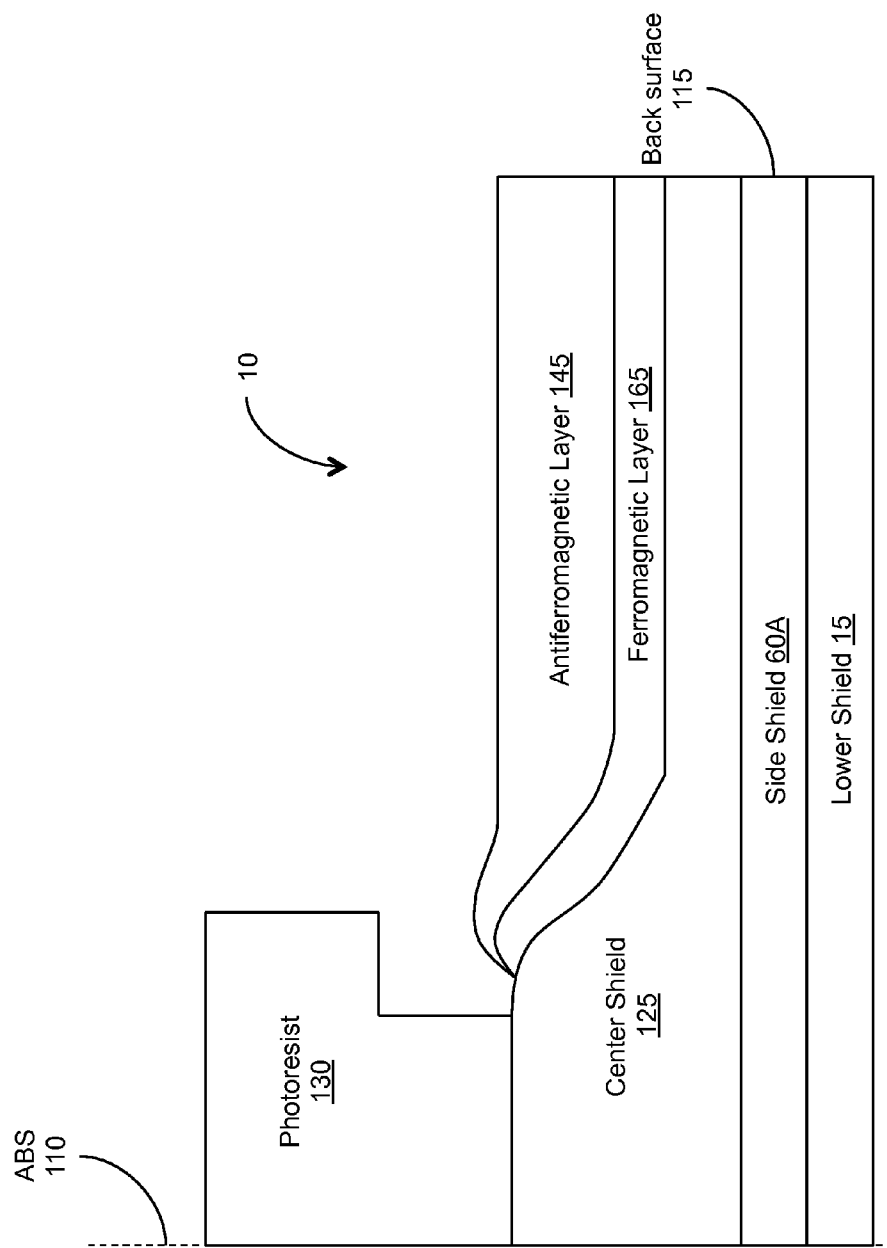
FIG. 12A is another throat-cut view of a portion of an incomplete TDMR read head device being fabricated according to the exemplary process illustrated in FIG. 5.

FIG. 12A is a throat-cut view of the incomplete TDMR read head 10 after the antiferromagnetic layer 145 has been formed over the ferromagnetic layer 165, and FIG. 12B is the corresponding top-down view.

Figure 13A:
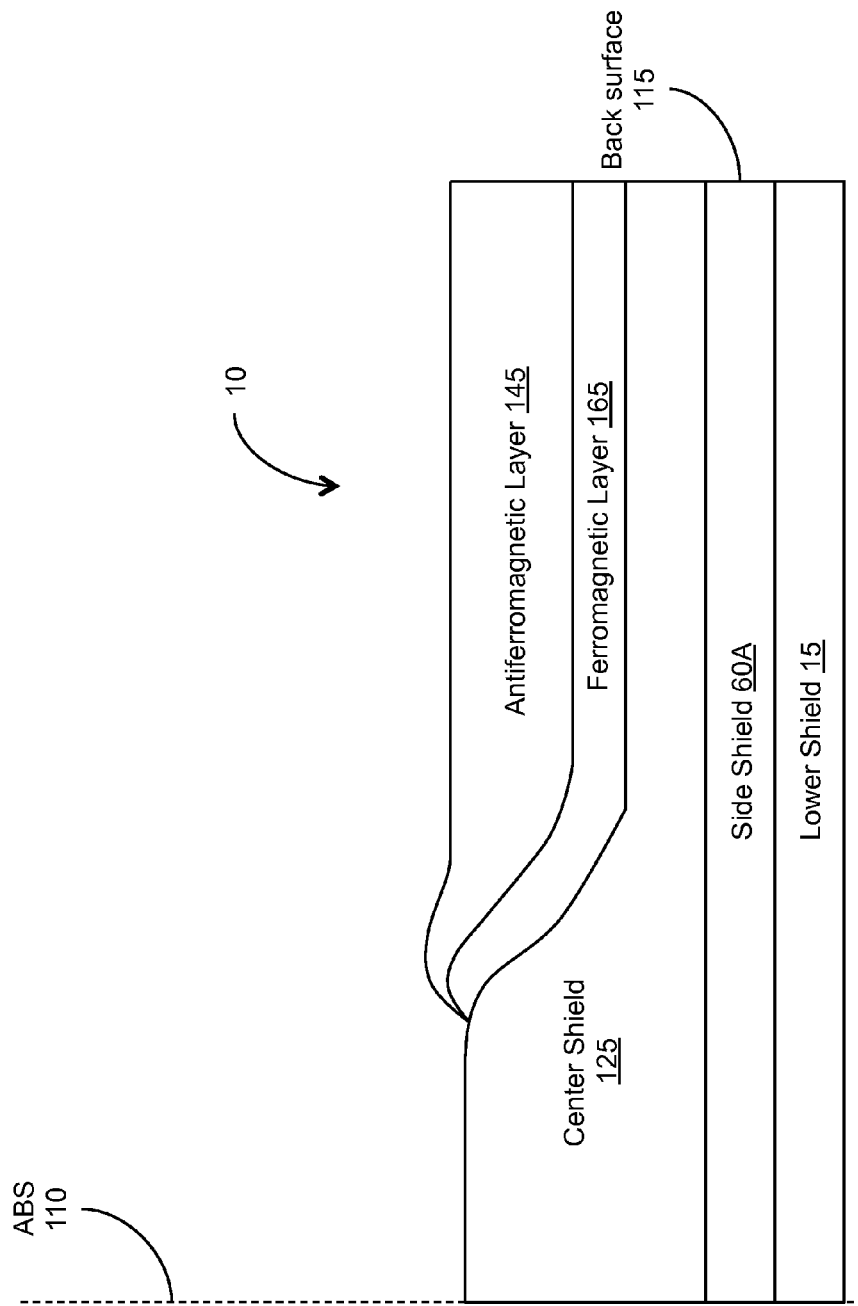
FIG. 13A is another throat-cut view of a portion of an incomplete TDMR read head device being fabricated according to the exemplary process illustrated in FIG. 5.
Figure 13B:
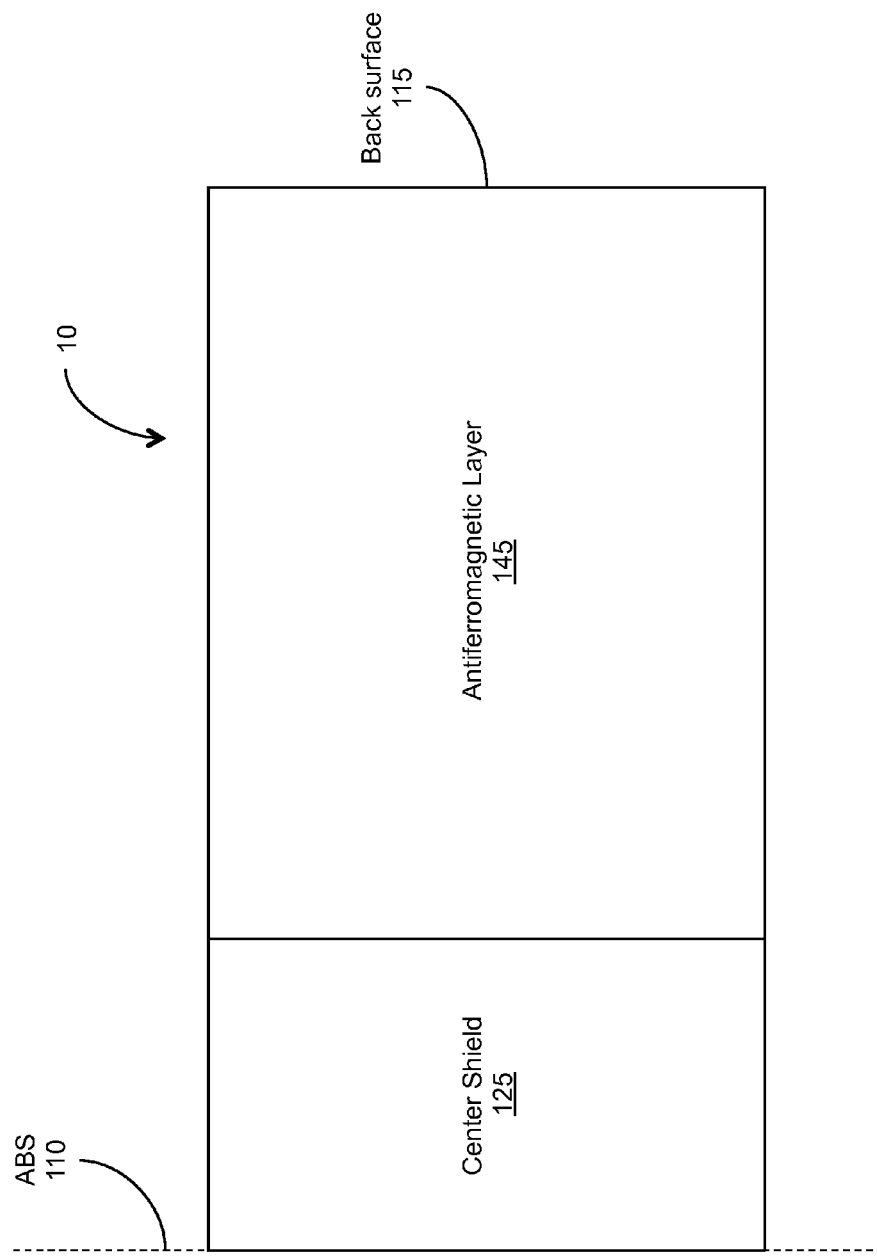
FIG. 13B is a top-down view of the incomplete TDMR read head device illustrated in FIG. 13A.

In some embodiments, any protective material (e.g., photoresistive material 130) deposited to facilitate the removal of the portion of the center shield 125 and to facilitate the formation of an antiferromagnetic layer 145 that is recessed from the ABS 110 is removed after the antiferromagnetic layer 145 has been formed. FIG. 13A is a throat-cut view of the incomplete TDMR read head 10 after the photoresistive material 130 has been removed from the TDMR read head 10, and FIG. 13B is the corresponding top-down view.

Figure 14A:
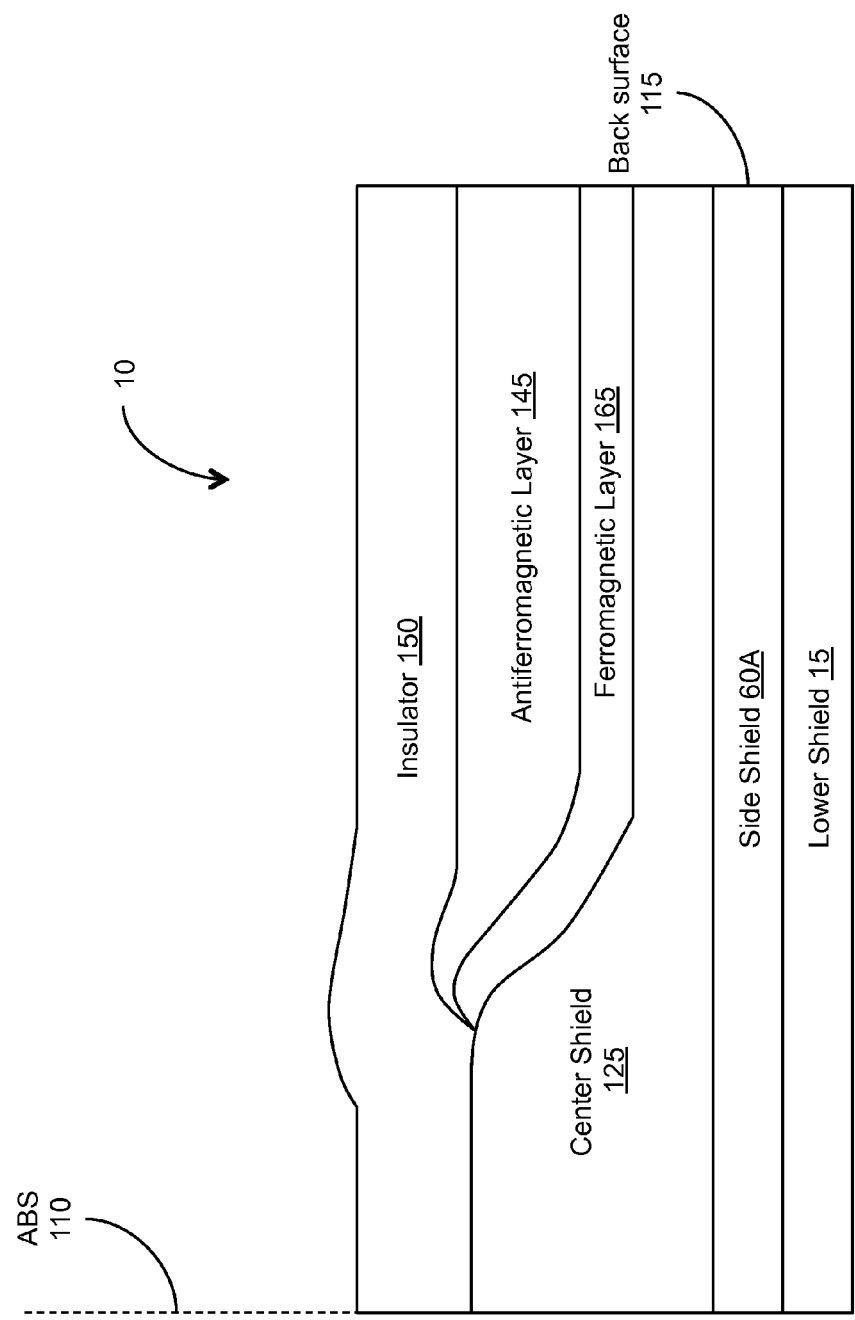
FIG. 14A is another throat-cut view of a portion of an incomplete TDMR read head device being fabricated according to the exemplary process illustrated in FIG. 5.
Figure 14B:
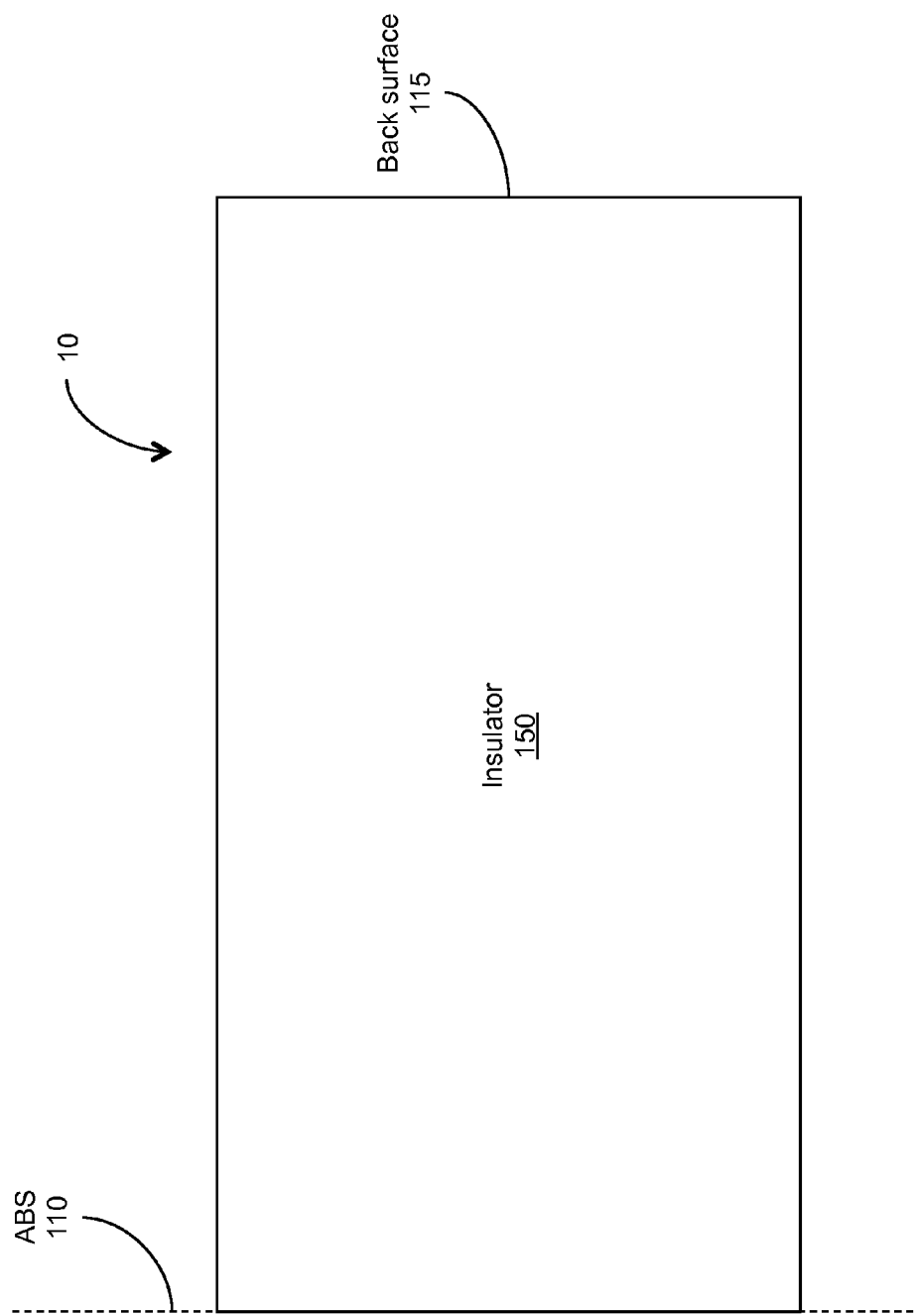
FIG. 14B is a top-down view of the incomplete TDMR read head device illustrated in FIG. 14A.

Referring again to FIG. 5, at step 440, an insulator layer 150 is optionally formed over the antiferromagnetic layer 145 and an exposed portion of the center shield 125 that was previously protected by the photoresistive material 130. FIG. 14A is a throat-cut view of the incomplete TDMR read head 10 after the optional insulator layer 150 has been formed over the antiferromagnetic layer 145 and the exposed portion of the center shield 125, and FIG. 14B is the corresponding top-down view. If included, the insulator layer 150 may be made of a material having a low dielectric constant (e.g., a material having a dielectric constant of less than eight), such as silicon oxide (SiO) or silicon oxycarbide (SiOC). If included, the insulator layer 150 may have any suitable thickness, for example, between 30 and 100 Angstroms. A thickness of 40 Angstroms has been found to be advantageous.

Referring again to FIG. 5, at step 445, the remainder of the TDMR read head 10, including a second read sensor (e.g., upper read sensor 100B) and any associated shields, insulating layers, and/or seed layers (as shown, for example, in FIG. 3), is formed. At 450, the process ends.

As explained above, although FIG. 5 contemplates a TDMR read head 10 having two read sensors, it is to be understood that the process 400 to fabricate a recessed antiferromagnetic layer 145 to stabilize a center shield 125 can be used to fabricate a TDMR read head 10 having more than two read sensors 100.

Figure 15:
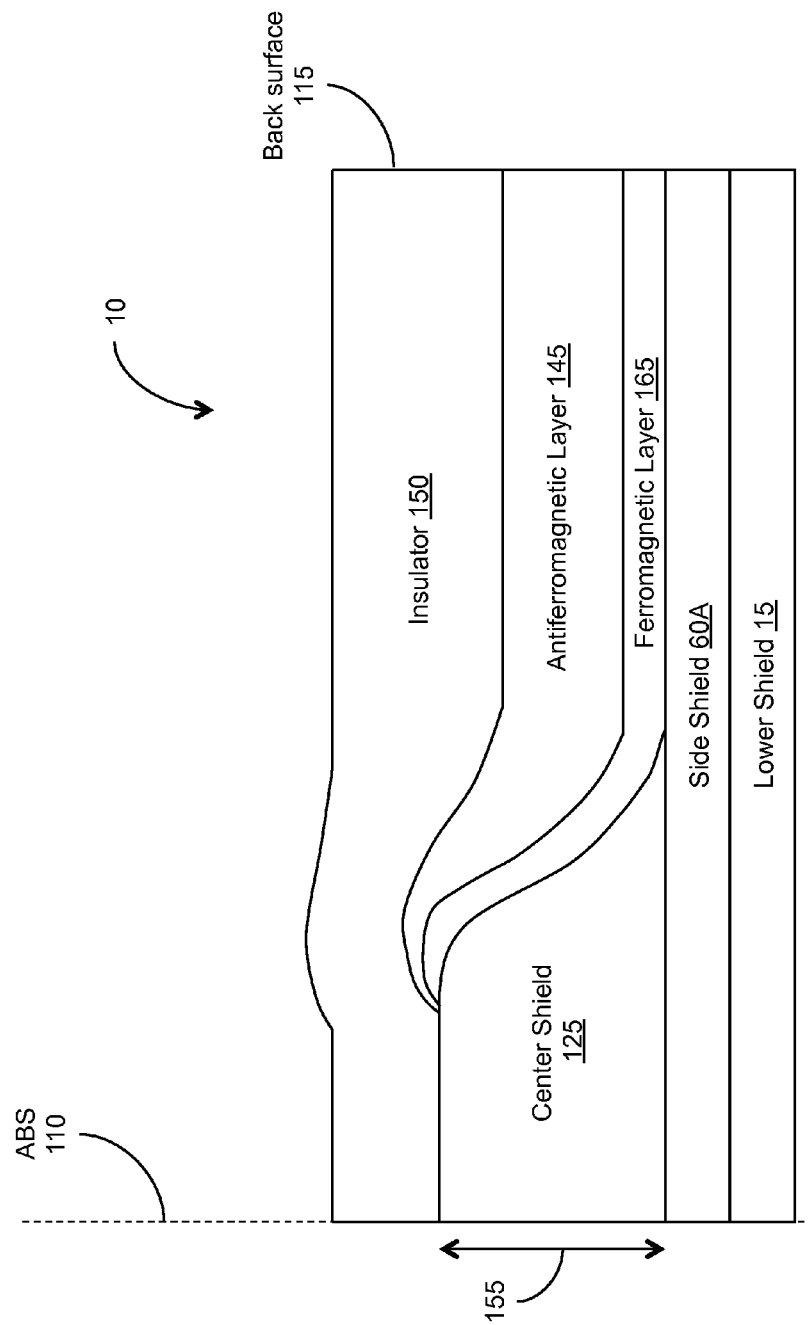
FIG. 15 is another throat-cut view of a portion of an incomplete TDMR read head device being fabricated according to the exemplary process illustrated in FIG. 5.

As explained above, after the portion of the center shield 125 closer to the back surface 115 of the TDMR read head 10 has been removed, the center shield 125 is thicker at the ABS 110 than at the back surface 115. In some embodiments, a first thickness 155 of the center shield 125 is a nonzero value, and a second thickness 160 of the center shield 125 at the back surface 115 is zero or close to zero. FIG. 15 is a throat-cut view of an incomplete TDMR read head 10 in which the center shield 125 ends well short of the back surface 115. In other words, the center shield 125 has been completely removed at the back surface 115 so that the second thickness 160 is zero. In contrast, the first thickness 155 at the ABS 110 is a nonzero value.

Figure 16:
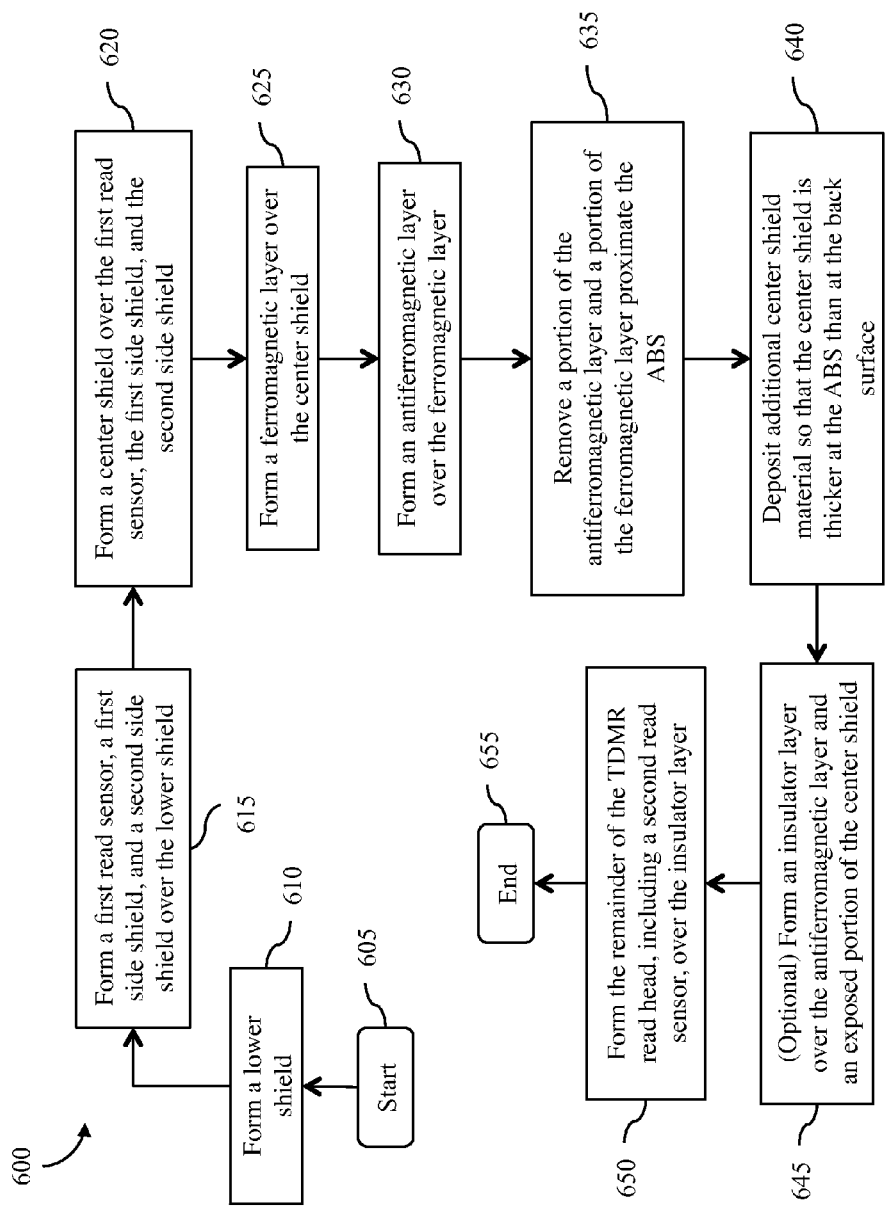
FIG. 16 is a flowchart of another process to fabricate a TDMR read head in accordance with some embodiments.

FIG. 16 is a flowchart of a second process 600 to fabricate a TDMR read head 10 in accordance with some embodiments. FIGS. 17A through 23 illustrate the incomplete TDMR read head 10 at various stages of fabrication according to the process 600 of FIG. 16. The layers and dimensions of the various layers of the TDMR read head 10 shown in FIGS. 17A to 23 are not necessarily to scale.

At 605, the process begins. At step 610, a lower shield (e.g., lower shield 15) is formed. At step 615, a first read sensor (e.g., the lower read sensor 100A) and its associated side shields (e.g., side shields 60A, 60B) are formed over the lower shield. Steps 610 and 615 are identical to steps 410 and 415, respectively, of FIG. 5 and are not discussed further here. FIGS. 6A and 6B illustrate the throat-cut and top-down views of the TDMR read head 10 after completion of steps 610 and 615.

At step 620, a center shield 125 is formed over the first read sensor and side shields. In some embodiments, step 620 is identical to step 420 of FIG. 5. The center shield 125 may be fabricated using any suitable material, such as, for example, nickel-iron (NiFe), nickel-iron-molybdenum (NiFeMo), nickel-iron-copper (NiFeCu), nickel-iron-chromium (NiFeCr), or a combination of these. As explained previously, the center shield may have a laminated structure comprising at least two materials, such as, for example, NiFe layers separated from each other by anti-ferromagnetic coupling layers such as ruthenium (Ru). If the center shield 125 is made of NiFe, the center shield 125 may be fabricated by depositing alternating thin layers of nickel and iron. The center shield 125 may have any suitable thickness but may typically be in the range of 75 Angstroms to 500 Angstroms. A thickness of 180 Angstroms has been found to be advantageous. In some embodiments, the thickness of the center shield 125 formed in step 620 is the desired second thickness 160 of the center shield 125 at the back surface 115 of the TDMR read head 10. FIGS. 7A and 7B illustrate the throat-cut and top-down views of the TDMR read head 10 after completion of step 620.

Referring again to FIG. 16, at step 625, a ferromagnetic layer 165 is formed over the center shield 125. The ferromagnetic layer 165 may be made of any suitable material, such as, for example, nickel (Ni), cobalt (Co), iron (Fe), nickel-iron (NiFe), cobalt-iron (CoFe), nickel-iron-chromium (NiFeCr), nickel-iron-molybdenum (NiFeMo), nickel-iron-copper (NiFeCu), cobalt-zirconium-tantalum (CoZrTa), cobalt-zirconium-niobium (CoZrNb), cobalt-iron-zirconium (CoFeZr), or a combination of these. The ferromagnetic layer 165 may have any suitable thickness, for example, between 10 and 50 Angstroms. A thickness of around 20 Angstroms has been found to be advantageous. As explained earlier in the context of FIG. 5, the ferromagnetic layer 165 can include a stitch layer 135 and a nanolayer 140.

Figure 17A:
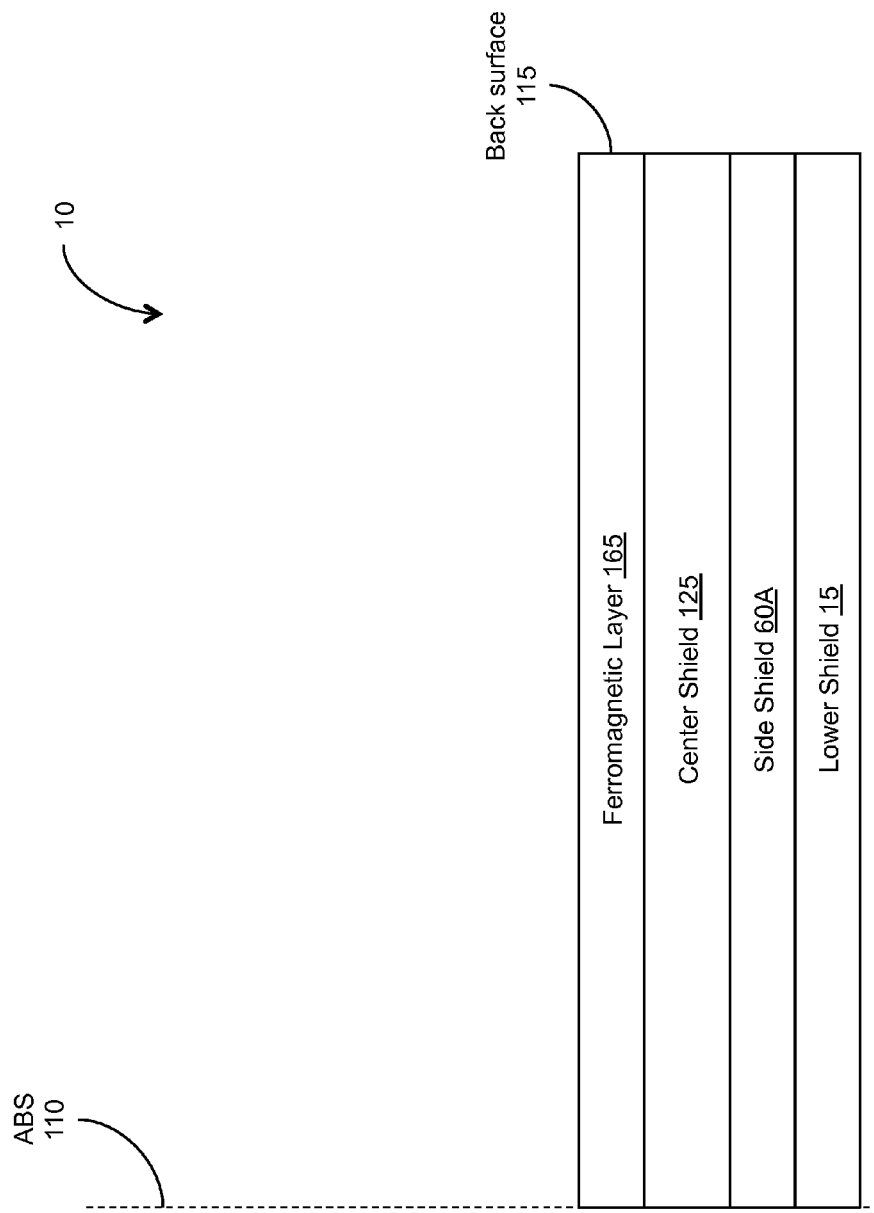
FIG. 17A is a throat-cut view of a portion of an incomplete TDMR read head device being fabricated according to the exemplary process illustrated in FIG. 16.

FIG. 17A is a throat-cut view of a portion of an incomplete TDMR read head device after the ferromagnetic layer 165 has been formed over the center shield 125, and FIG. 17B is the corresponding top-down view.

Referring again to FIG. 16, at step 630, an antiferromagnetic layer 145 is formed over the ferromagnetic layer 165. The antiferromagnetic layer 145 may be made of any suitable material, such as, for example, iridium and manganese. For example, the antiferromagnetic layer 145 may be an alloy such as IrMn (where Mn is between about 70 and 85 atomic percent), or any other antiferromagnetic material, such as, for example, PtMn, NiMn, FeMn, PdMn, PtPdMn, or RhMn. The antiferromagnetic layer 145 may have any suitable thickness, for example, between 60 and 100 Angstroms. A thickness of around 80 Angstroms has been found to be advantageous.

Figure 18B:
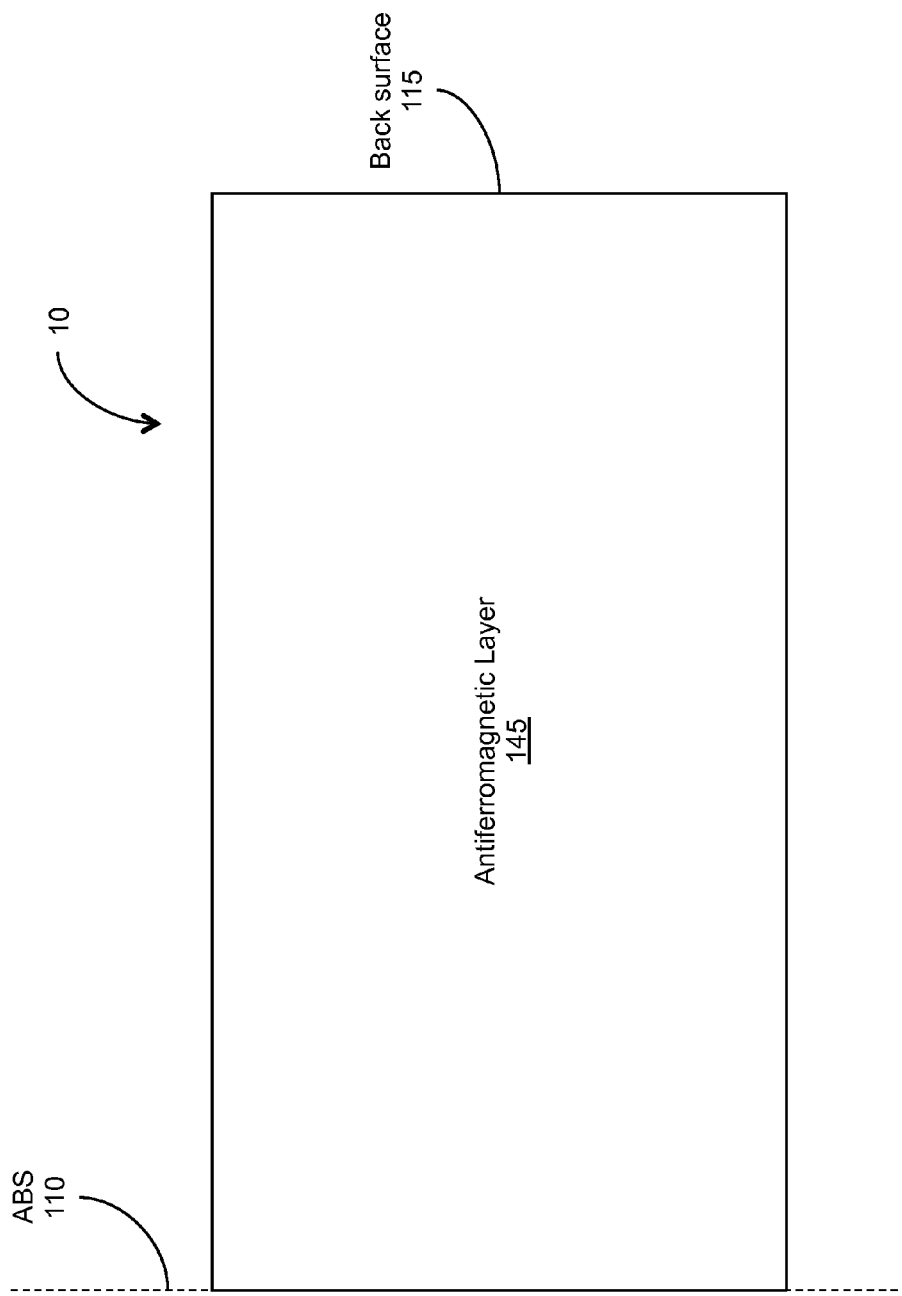
FIG. 18B is a top-down view of the incomplete TDMR read head device illustrated in FIG. 18A.

FIG. 18A is a throat-cut view of a portion of an incomplete TDMR read head device 10 after completion of step 630 of FIG. 16, and FIG. 18B is the corresponding top-down view.

Referring again to FIG. 16, at step 635, a portion of the antiferromagnetic layer 145 proximate the ABS 110 and a portion of the ferromagnetic layer 165, also proximate the ABS 110, are removed, thereby exposing a portion of the center shield 125. The portions of the antiferromagnetic layer 145 and the ferromagnetic layer 165 can be removed using well-known, conventional techniques, such as, for example, applying photoresistive material or a hard mask and ion-milling or etching to remove the desired portions of the antiferromagnetic layer 145 and the ferromagnetic layer 165.

Figure 19A:
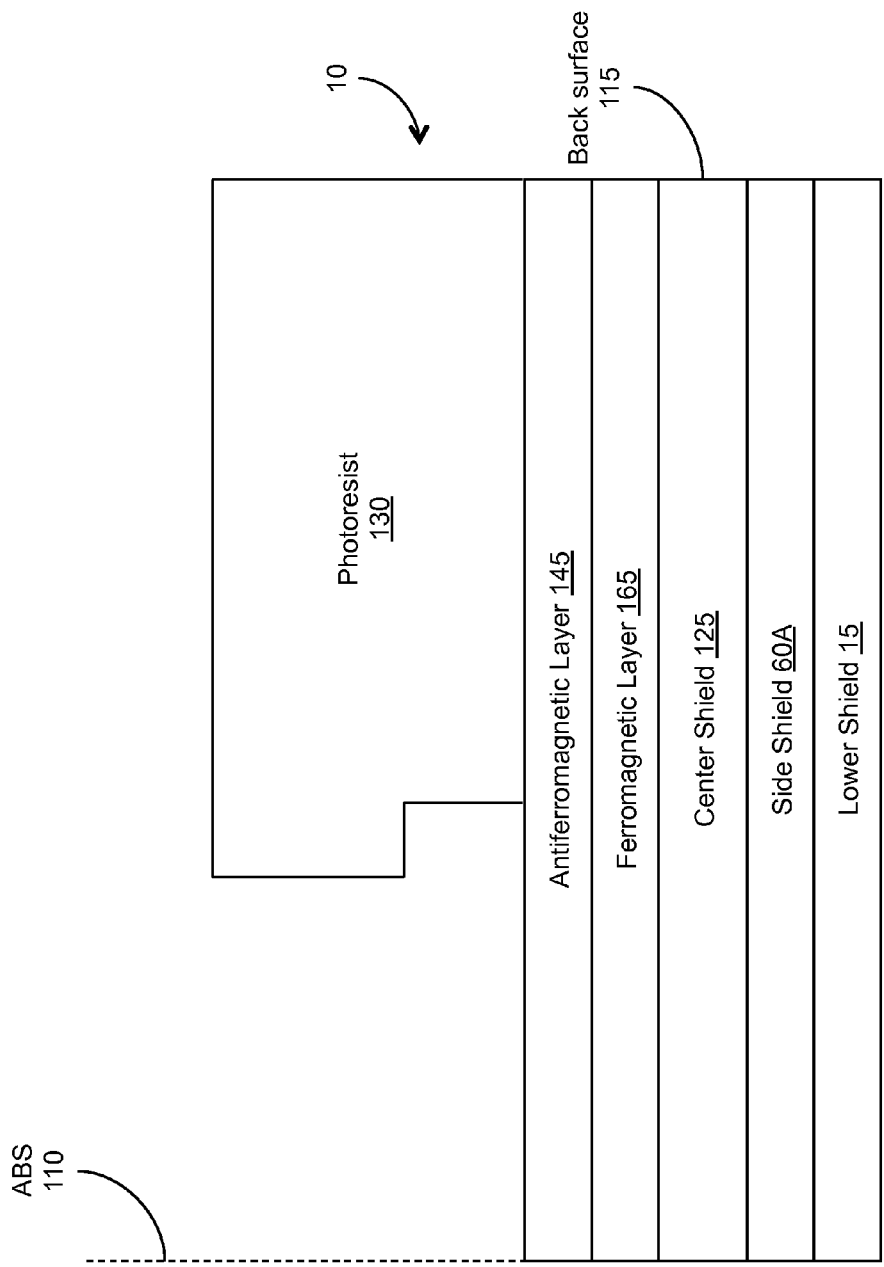
FIG. 19A is a throat-cut view of a portion of an incomplete TDMR read head device being fabricated according to the exemplary process illustrated in FIG. 16.

FIG. 19A is a throat-cut view of the incomplete TDMR read head 10 before the portions of the antiferromagnetic layer 145 and the ferromagnetic layer 165 have been removed. As shown in the embodiment illustrated in FIG. 19A, photoresistive material 130 has been deposited over an area of the antiferromagnetic layer 145 proximate the back surface 115 of the TDMR read head 10. The photoresistive material 130 can be any conventional material that protects the portion of the TDMR read head 10 near the back surface 115 while material (i.e., the portions of the antiferromagnetic layer 145 and the ferromagnetic layer 165) closer to the ABS 110 is being removed. As stated previously, a hard mask or other well-known techniques to lithographically define a region of the TDMR read head 10 to be protected during a subsequent fabrication step could be used instead of the photoresistive material 130 shown in FIG. 19A. FIG. 19B is a top-down view of the incomplete TDMR read head 10 after the photoresistive material 130 has been deposited as illustrated in FIG. 19A.

FIG. 20A is a throat-cut view of the incomplete TDMR read head 10 after the portions of the antiferromagnetic layer 145 and the ferromagnetic layer 165 proximate the ABS 110 have been removed in step 635 of FIG. 16 to expose a portion of the center shield 125, and FIG. 20B is the corresponding top-down view.

Figure 21:
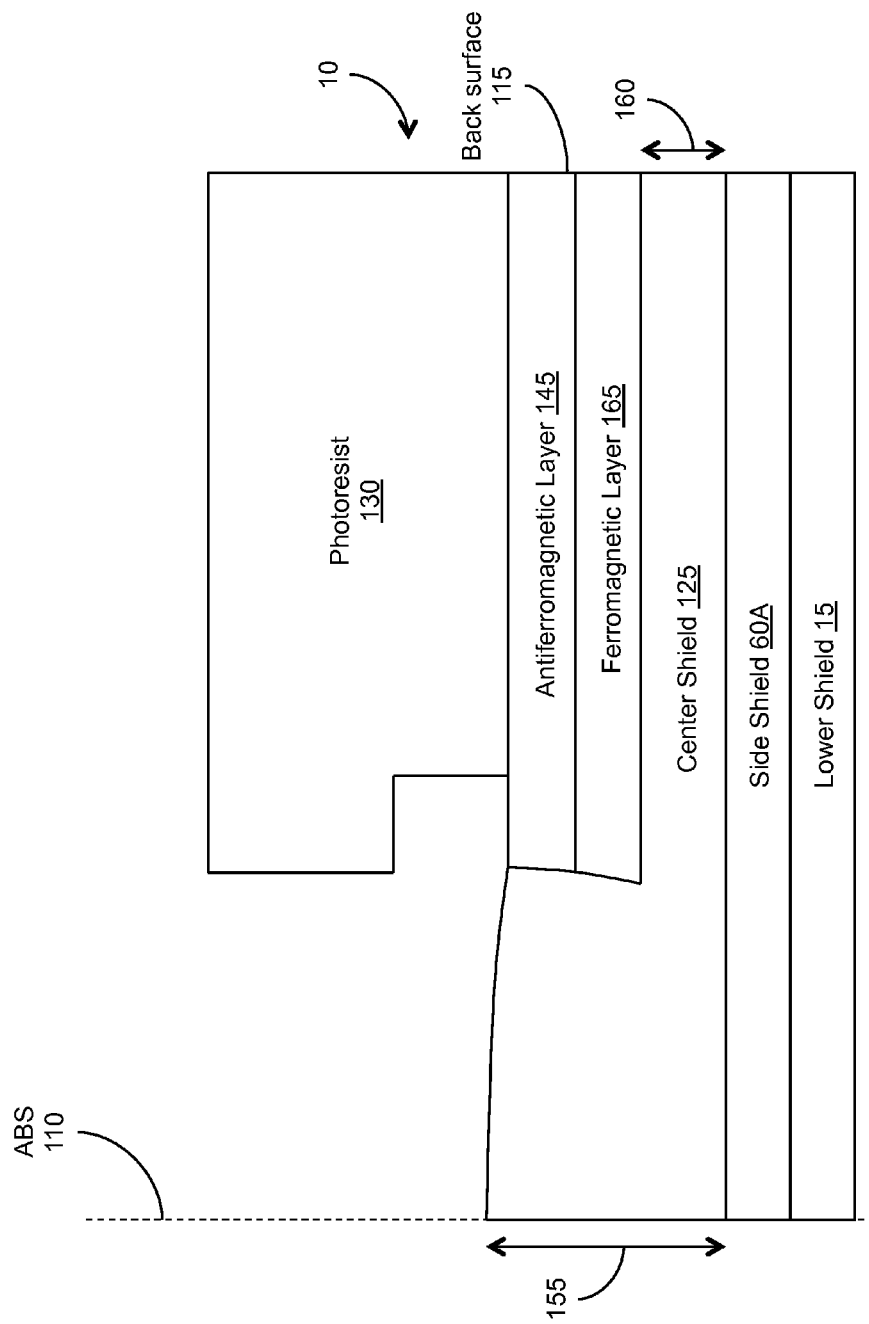
FIG. 21 is a throat-cut view of a portion of an incomplete TDMR read head device being fabricated according to the exemplary process illustrated in FIG. 16.

Referring again to FIG. 16, at step 640, additional center shield 125 material is deposited over the exposed portion of the center shield 125, filling at least a portion of the region previously occupied by the portions of the antiferromagnetic layer 145 and ferromagnetic layer 165 removed in step 635. FIG. 21 is a throat-cut view of a portion of the incomplete TDMR read head 10 after additional center shield 125 material has been deposited in step 640 of FIG. 16. As illustrated in the embodiment of FIG. 21, enough additional center shield 125 material has been deposited to bring the height of the center shield 125 at the ABS 110 to approximately the height of the antiferromagnetic layer 145. In other embodiments, more or less additional center shield 125 material can be deposited. As shown in FIG. 21, the center shield 125 has a first thickness 155 at the ABS 110 and a second thickness 160 at the back surface 115, where the first thickness 155 is greater than the second thickness 160.

Figure 22B:
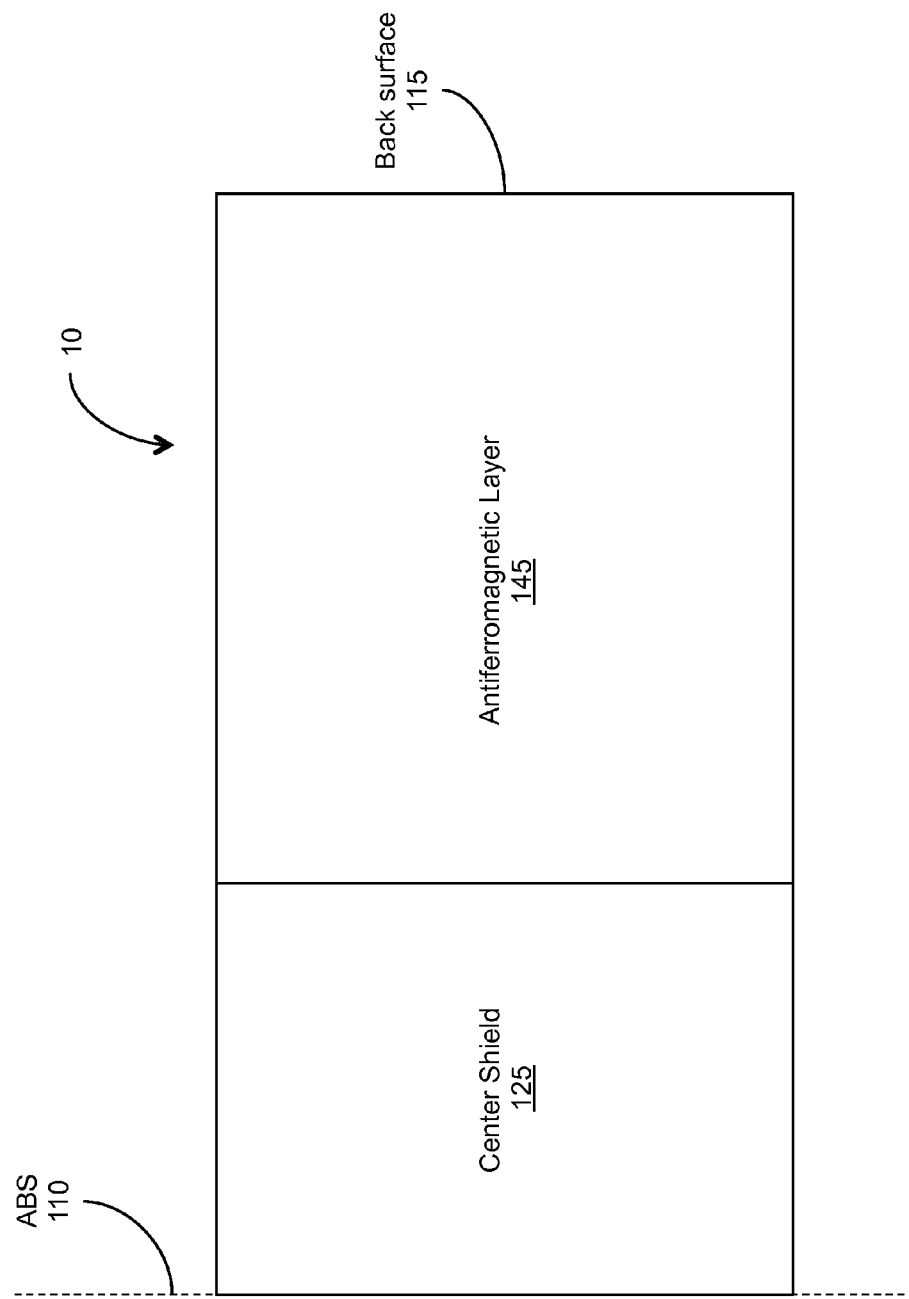
FIG. 22B is a top-down view of the incomplete TDMR read head device illustrated in FIG. 22A.

FIG. 22A is a throat-cut view of a portion of the incomplete TDMR read head 10 after the photoresistive material 130 has been removed after completion of step 640 of FIG. 16, and FIG. 22B is the corresponding top-down view.

Figure 23:
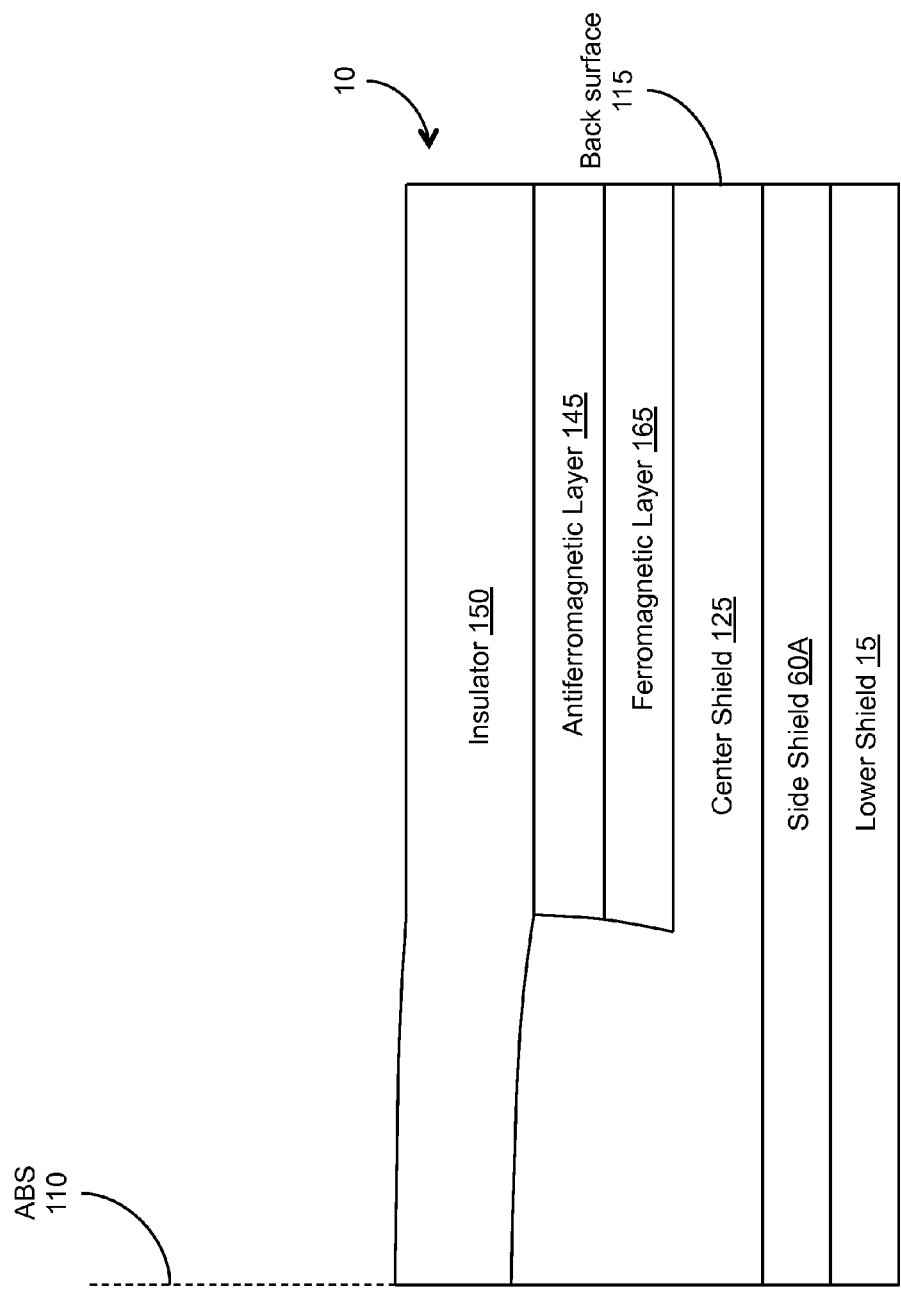
FIG. 23 is a throat-cut view of a portion of an incomplete TDMR read head device being fabricated according to the exemplary process illustrated in FIG. 16.

Referring again to FIG. 16, at step 645, an optional insulator layer 150 is formed over the antiferromagnetic layer 145 and the exposed portion of the center shield 125. FIG. 23 is a throat-cut view of the incomplete TDMR read head 10 after the optional insulator layer 150 has been formed. If included, the insulator layer 150 may be made of a material having a low dielectric constant (e.g., a material having a dielectric constant of less than eight), such as silicon oxide (SiO) or silicon oxycarbide (SiOC). If included, the insulator layer 150 may have any suitable thickness, for example, between 30 and 100 Angstroms. A thickness of 40 Angstroms has been found to be advantageous.

Referring again to FIG. 16, at step 650, the remainder of the TDMR read head 10, including a second read sensor (e.g., upper read sensor 100B) and any associated shields, insulating layers, and/or seed layers (as shown, for example, in FIG. 3), is formed. At 655, the process ends.

In the foregoing description and in the accompanying drawings, specific terminology has been set forth to provide a thorough understanding of the disclosed embodiments. In some instances, the terminology may imply specific details that are not required to practice the invention. For example, the materials used in a TDMR read head 10 may be different from those described above in various embodiments. Similarly, the processes used to fabricate a TDMR read head 10 may be different from those described above in various embodiments. For example, the lithographic processes may differ from those described above.

To avoid obscuring the present disclosure unnecessarily, well-known components (e.g., of a disk drive) or layers (e.g., of TDMR devices or read sensors) are shown in block diagram form and/or are not discussed in detail or, in some cases, at all. Unless otherwise indicated herein, prior-art fabrication processes and known materials may be used for the disclosed TDMR read head 10.

Unless otherwise specifically defined herein, all terms are to be given their broadest possible interpretation, including meanings implied from the specification and drawings and meanings understood by those skilled in the art and/or as defined in dictionaries, treatises, etc. The terms "magnetization," "direction of magnetization," "magnetization direction," and "magnetic moment" are used interchangeably herein.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

The term "coupled" is used herein to express a direct connection as well as a connection through one or more intervening circuits or structures. To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one layer with respect to other layers. For example, one layer disposed "over" or "under" another layer may be directly in contact with the other layer or may have one or more intervening layers. Moreover, one layer disposed "between" two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Although the drawings illustrate most layers as being single layers, many of these layers may have multilayer structures, as would be appreciated by a person having ordinary skill in the art. Similarly, the drawings are not necessarily to scale, and the dimensions of the layers and TDMR read head 10 may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A two-dimensional magnetic recording (TDMR) read head, comprising:
    a first read sensor;
    a center shield over the first read sensor, wherein the center shield has a first thickness at an air-bearing surface (ABS) and a second thickness at a back surface, the first thickness being greater than the second thickness;
    a ferromagnetic layer over a portion of the center shield, wherein the ferromagnetic layer is recessed from the ABS;
    an antiferromagnetic layer over the ferromagnetic layer, wherein the ferromagnetic layer is at least partially sandwiched between the antiferromagnetic layer and the center shield; and
    a second read sensor over the antiferromagnetic layer.

2. The TDMR read head recited in claim 1, wherein the second thickness is zero.

3. The TDMR read head recited in claim 1, wherein the ferromagnetic layer comprises a stitch layer and a nanolayer.

4. The TDMR read head recited in claim 3, wherein the nanolayer comprises cobalt-iron (CoFe) or cobalt.

5. The TDMR read head recited in claim 1, further comprising an insulator layer disposed over the antiferromagnetic layer and an exposed portion of the center shield.

6. A hard disk drive comprising the TDMR read head recited in claim 1.

7. A method of fabricating the TDMR read head recited in claim 1, the method comprising:
    forming the first read sensor;
    forming the center shield over the first read sensor;
    removing a part of the center shield so that the center shield has the first thickness at the ABS and the second thickness at the back surface;
    forming the ferromagnetic layer over the portion of the center shield;
    forming the antiferromagnetic layer over the ferromagnetic layer; and
    forming the second read sensor over the antiferromagnetic layer.

8. The method of claim 7, further comprising:
    forming an insulator layer over the antiferromagnetic layer and an exposed portion of the center shield.

9. The method of claim 7, wherein forming the ferromagnetic layer over the portion of the center shield comprises:
    forming a stitch layer over the portion of the center shield; and
    forming a nanolayer over the stitch layer.

10. The method of claim 9, wherein the nanolayer comprises cobalt iron (CoFe) or cobalt.

11. The method of claim 7, wherein removing the part of the center shield comprises:
    applying a photoresist material; and
    ion milling to remove the part of the center shield.

12. The method of claim 7, wherein the second thickness is zero.

13. The TDMR read head fabricated using the method recited in claim 7.

14. A hard disk drive comprising the TDMR read head recited in claim 13.

15. A method of fabricating the TDMR read head recited in claim 1, the method comprising:
    forming the first read sensor;
    forming the center shield over the first read sensor, the center shield made of a first material;
    forming the ferromagnetic layer over the center shield;

forming the antiferromagnetic layer over the ferromagnetic layer;

removing a portion of the antiferromagnetic layer proximate the ABS;

removing a portion of the ferromagnetic layer proximate the ABS to expose a part of the center shield;

depositing additional first material over the exposed part of the center shield so that the center shield has the first thickness at the ABS and the second thickness at the back surface; and forming the second read sensor over the antiferromagnetic layer.

16. The method of claim 15, further comprising:

after depositing the additional first material over the exposed part of the center shield, forming an insulator layer over the antiferromagnetic layer and the center shield.

17. The method of claim 15, wherein forming the ferromagnetic layer over the center shield comprises:

forming a stitch layer over the center shield; and forming a nanolayer over the stitch layer.

18. The method of claim 17, wherein the nanolayer comprises cobalt iron (CoFe) or cobalt.

19. The method of claim 15, wherein removing the portion of the antiferromagnetic layer proximate the ABS comprises:

applying a photoresist material over the antiferromagnetic layer proximate the back surface; and ion milling to remove the portion of the antiferromagnetic layer proximate the ABS.

20. The TDMR read head fabricated using the method recited in claim 15.

21. A hard disk drive comprising the TDMR read head recited in claim 20.

* * * * *